(12) United States Patent
Li et al.

(10) Patent No.: US 7,709,562 B2
(45) Date of Patent: May 4, 2010

(54) THERMOPLASTIC COMPOSITIONS, METHODS OF MAKING, AND ARTICLES FORMED THEREFROM

(75) Inventors: Ying Li, Shanghai (CN); Brian D. Mullen, Mount Vernon, IN (US); Srinivas Siripurapu, Evansville, IN (US); Pei Sun, Shanghai (CN); Wayne Yao, Shanghai (CN)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 422 days.

(21) Appl. No.: 11/860,513

(22) Filed: Sep. 24, 2007

(65) Prior Publication Data

US 2008/0081860 A1      Apr. 3, 2008

Related U.S. Application Data

(63) Continuation-in-part of application No. 11/736,262, filed on Apr. 17, 2007, now Pat. No. 7,652,083, which is a continuation-in-part of application No. 11/537,021, filed on Sep. 29, 2006.

(51) Int. Cl.
*C08L 69/00* (2006.01)

(52) U.S. Cl. ............ 524/108; 524/127; 524/141; 524/162; 524/165; 524/267; 524/269; 525/67; 525/464; 528/203

(58) Field of Classification Search ............ None
See application file for complete search history.

(56) References Cited

U.S. PATENT DOCUMENTS

| 4,471,104 A | 9/1984 | Krishnan et al. |
| 6,657,018 B1 | 12/2003 | Hoover |

FOREIGN PATENT DOCUMENTS

| JP | 05247197 | * 9/1993 |

OTHER PUBLICATIONS

International Search Report for International Application No. PCT/US2007/084676.
International Search Report for International Application No. PCT/US2007/071318.
Masaya Okamoto: "Relationship between the end-cap structure of polycarbonates and their impact resistance", Polymer, vol. 42, No. 20, 2001, pp. 8355-8359.

* cited by examiner

*Primary Examiner*—David Buttner

(57) ABSTRACT

A thermoplastic composition comprises a polycarbonate having repeating structural carbonate units of the formula (1):

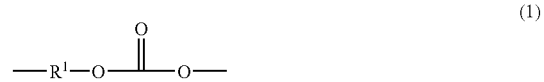

wherein at least 60 percent of the total number of $R^1$ groups contain aromatic organic groups and the balance thereof are aliphatic, alicyclic, or aromatic groups; and wherein the polycarbonate comprises terminal groups derived from reaction with a cyanophenol of the formula

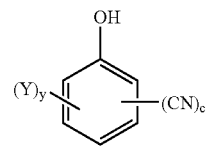

wherein Y is a halogen, $C_{1-3}$ alkyl group, $C_{1-3}$ alkoxy group, $C_{7-12}$ arylalkyl, $C_{7-12}$ alkylaryl, or nitro group, y is 0 to 4, and c is 1 to 5, provided that y+c is 1 to 5; optionally a branching agent; an impact modifier; and a flame retardant. The compositions are useful in the manufacture of a wide variety of parts, particularly those having a thin wall.

23 Claims, 3 Drawing Sheets

THERMOPLASTIC COMPOSITIONS, METHODS OF MAKING, AND ARTICLES FORMED THEREFROM

CROSS REFERENCE TO RELATED APPLICATIONS

This application is a continuation-in-part of U.S. application Ser. No. 11/736,262, filed Apr. 17, 2007, which is a continuation-in-part of U.S. application Ser. No. 11/537,021, filed Sep. 29, 2006.

BACKGROUND OF THE INVENTION

This disclosure relates to polycarbonate compositions, and in particular to endcapped polycarbonate compositions, methods of manufacture, and uses thereof.

Polycarbonate is a high-performance plastic with good impact strength (ductility). However, polycarbonate often has relatively limited flow properties, which is needed in the manufacture of thin walled articles. Medium to high flow polycarbonate grades suffer from the fact that the low temperature ductility is sacrificed for a better flow. Furthermore, polycarbonate compositions often require the use of flame retardants to find successful use in the manufacture of a variety of articles and components.

A widely used method to increase low temperature impact resistance is the addition of impact modifiers, for example, methacrylate-butadiene-styrene (MBS) rubbers or acrylonitrile-butadiene-styrene (ABS) rubbers, to the polycarbonate compositions. In addition, flame retardants are often added to improve the flame retardant properties of the polycarbonate compositions.

There accordingly remains a need in the art for high flow polycarbonate compositions and articles made from them that are flame retardant.

SUMMARY OF THE INVENTION

The above-described and other deficiencies of the art are met by a thermoplastic composition comprising a cyanophenyl endcapped polycarbonate having repeating structural carbonate units of the formula (1):

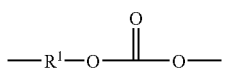  (1)

wherein at least 60 percent of the total number of $R^1$ groups contain aromatic organic groups and the balance thereof are aliphatic, alicyclic, or aromatic groups; wherein the polycarbonate comprises terminal groups derived from reaction with a cyanophenol of the formula (2):

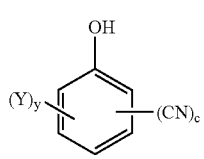  (2)

wherein Y is a halogen, $C_{1-3}$ alkyl group, $C_{1-3}$ alkoxy group, $C_{7-12}$ arylalkyl, $C_{7-12}$ alkylaryl, or nitro group, y is 0 to 4, and c is 1 to 5, provided that y+c is 1 to 5; and a flame retardant.

A thermoplastic composition can also comprise polycarbonate having repeating structural carbonate units of the formula

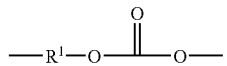

wherein at least 60 percent of the total number of $R^1$ groups are derived from bisphenol A, and wherein the polycarbonate comprises cyanophenyl carbonate endcapping groups derived from reaction with p-cyanophenol and/or 3,4-dicyanophenol; and an alkali metal salt of a perfluorinated $C_{1-16}$ sulfonate salt.

In still another embodiment, a thermoplastic composition comprises a polycarbonate having repeating structural carbonate units of the formula

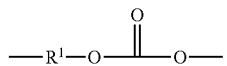

wherein at least 80 percent of the total number of $R^1$ groups are derived from bisphenol A; and wherein the polycarbonate comprises cyanophenyl carbonate endcapping groups derived from reaction with p-cyanophenol; and potassium perfluorobutane sulfonate and/or potassium diphenylsulfone sulfonate.

In another embodiment, a polycarbonate comprises repeating carbonate units of the formula

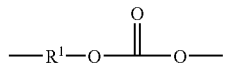

wherein at least 60 percent of the total number of $R^1$ groups contain aromatic organic groups and the balance thereof are aliphatic, alicyclic, or aromatic groups; repeating ester units of the formula

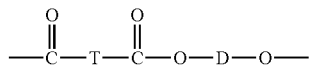

wherein D is a divalent group derived from a dihydroxy compound and T is a divalent group derived from a dicarboxylic acid; and repeating polysiloxane units of the formula

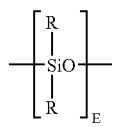

wherein each occurrence of R is same or different, and is a $C_{1-13}$ monovalent organic group and E has an average value of 4 to 50; and further wherein the polycarbonate comprises cyanophenyl endcapping groups derived from reaction with a cyanophenol of the formula

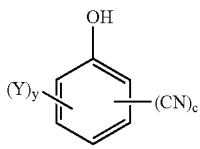

wherein Y is a halogen, $C_{1-3}$ alkyl group, $C_{1-3}$ alkoxy group, $C_{7-12}$ arylalkyl, $C_{7-12}$ alkylaryl, or nitro group, y is 0 to 4, and c is 1 to 5, provided that y+c is 1 to 5.

In another embodiment, a method of preparing a cyanophenyl endcapped polycarbonate comprises reacting a dihydroxy aromatic compound of the formula HO—$R^1$—OH, wherein at least 60 percent of the total number of $R^1$ groups contain aromatic organic groups and the balance thereof are aliphatic, alicyclic, or aromatic groups, with an activated carbonyl compound in the presence of a cyanophenol, in an aqueous biphasic medium at a pH of 8 to 11; wherein the cyanophenol, upon addition to the reaction, does not contain acid or amide groups that are detectable by FT-IR analysis of the cyanophenol.

In another embodiment, a method of preparing a thermoplastic composition comprises blending the above-described cyanophenyl endcapped polycarbonate, flame retardant, optional impact modifier, and/or other optional components to form a blend; and extruding the blend.

In yet another embodiment, an article comprises the above-described cyanophenyl endcapped polycarbonate or thermoplastic composition.

In still another embodiment, a method of manufacturing an article comprises extruding the above-described cyanophenyl endcapped polycarbonate or thermoplastic composition; and molding the extruded blend into an article.

In another embodiment, a thermoplastic composition comprises a polycarbonate having repeating structural carbonate units of the formula

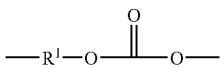

wherein at least 60 percent of the total number of $R^1$ groups contain aromatic organic groups and the balance thereof are aliphatic, alicyclic, or aromatic groups; and wherein the polycarbonate comprises cyanophenyl carbonate endcapping groups derived from reaction with a cyanophenol of the formula

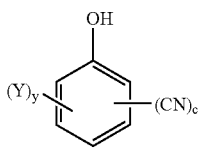

wherein Y is a halogen, $C_{1-3}$ alkyl group, $C_{1-3}$ alkoxy group, $C_{7-12}$ arylalkyl, alkylaryl, or nitro group, y is 0 to 4, and c is 1 to 5, provided that y+c is 1 to 5; wherein the polycarbonate comprises a branching agent; and a flame retardant. In one embodiment, the branching agent is a structure derived from a triacid trichloride of the formula

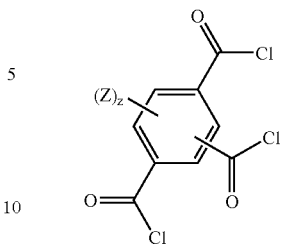

wherein Z is a halogen, $C_{1-3}$ alkyl group, $C_{1-3}$ alkoxy group, $C_{7-12}$ arylalkyl, alkylaryl, or nitro group, and z is 0 to 3. In another embodiment, the branching agent is a structure derived from a tri-substituted phenol of the formula

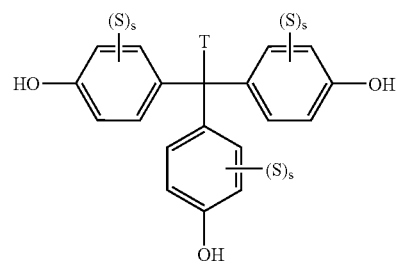

wherein T is a $C_{1-20}$ alkyl group, $C_{1-20}$ alkyleneoxy group, $C_{7-12}$ arylalkyl, or alkylaryl group, S is a halogen, $C_{1-3}$ alkyl group, $C_{1-3}$ alkoxy group, $C_{7-12}$ arylalkyl, alkylaryl, or nitro group, s is 0 to 4. In another embodiment, the branching agent comprises a structure of the formula

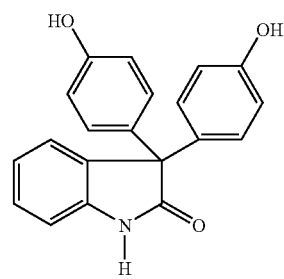

or a combination of comprising one or more of the branching agents.

In another embodiment, a thermoplastic composition comprises a polycarbonate having repeating structural carbonate units of the formula

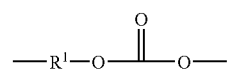

wherein at least 60 percent of the total number of $R^1$ groups contain aromatic organic groups and the balance thereof are aliphatic, alicyclic, or aromatic groups; and wherein the polycarbonate comprises cyanophenyl carbonate endcapping groups derived from reaction with a cyanophenol of the formula

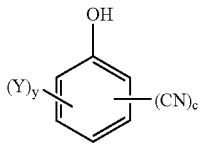

wherein Y is a halogen, $C_{1-3}$ alkyl group, $C_{1-3}$ alkoxy group, $C_{7-12}$ arylalkyl, alkylaryl, or nitro group, y is 0 to 4, and c is 1 to 5, provided that y+c is 1 to 5;

wherein the polycarbonate comprises a branching agent, wherein the branching agent is a structure derived from a triacid trichloride of the formula

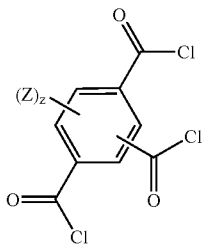

wherein Z is a halogen, $C_{1-3}$ alkyl group, $C_{1-3}$ alkoxy group, $C_{7-12}$ arylalkyl, alkylaryl, or nitro group, and z is 0 to 3; or wherein the branching agent is a structure derived from a tri-substituted phenol of the formula

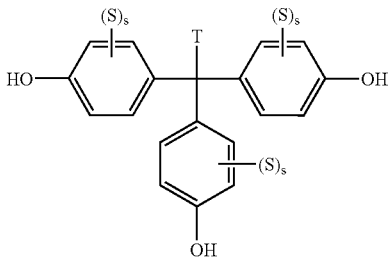

wherein T is a $C_{1-20}$ alkyl group, $C_{1-20}$ alkyleneoxy group, $C_{7-12}$ arylalkyl, or alkylaryl group, S is a halogen, $C_{1-3}$ alkyl group, $C_{1-3}$ alkoxy group, $C_{7-12}$ arylalkyl, alkylaryl, or nitro group, s is 0 to 4; or a combination of comprising one or more of the branching agents; and a flame retardant.

In another embodiment, a thermoplastic composition comprises a polycarbonate having repeating structural carbonate units of the formula

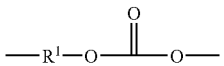

wherein at least 60 percent of the total number of $R^1$ groups contain aromatic organic groups and the balance thereof are aliphatic, alicyclic, or aromatic groups; and wherein the polycarbonate comprises cyanophenyl carbonate endcapping groups derived from reaction with a cyanophenol of the formula

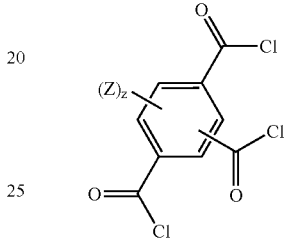

wherein Y is hydrogen, a halogen, $C_{1-3}$ alkyl group, $C_{1-3}$ alkoxy group, $C_{7-12}$ arylalkyl, alkylaryl, or nitro group, y is 0 to 4, and c is 1 to 5, provided that y+c is 1 to 5;

wherein the polycarbonate comprises a branching agent, wherein the branching agent is a structure derived from a triacid trichloride of the formula

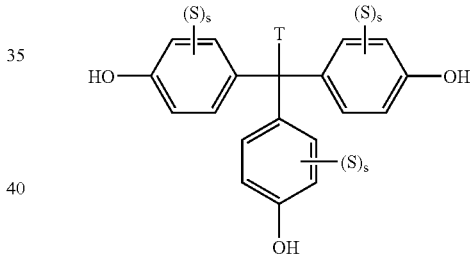

wherein z is 0; or wherein the branching agent is a structure derived from a tri-substituted phenol of the formula

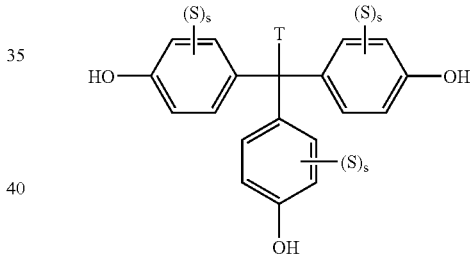

wherein T is methyl and s is 0; or a combination of comprising one or more of the branching agents; and a flame retardant, wherein the composition has a haze of less than about 3%, measured using 1.0 mm plaques according to ASTM-D1003-00.

In an embodiment, the branching agent is trimellitic trichloride (TMTC), tris-(hydroxyphenyl)ethane (THPE), isatin-bis-phenol or a combination of a least one of the foregoing branching agents.

In an embodiment, the flame retardant is a flame retardant salt or a cyclic siloxane or a combination of a salt and a cyclic siloxane. In an embodiment, the flame retardant salt is an alkali metal salt of a perfluorinated $C_{1-16}$ sulfonic acid. In another embodiment, the flame retardant salt is potassium perfluorobutane sulfonate or potassium diphenylsulfone sulfonate. In another embodiment, the cyclic siloxane is octaphenylcyclotetrasiloxane. In another embodiment, the flame retardant comprises a combination of potassium perfluorobutane sulfonate and octaphenylcyclotetrasiloxane.

In an embodiment, the cyanophenyl endcapping groups are present in an amount of 3 to 12 cyanophenyl carbonate units per 100 $R^1$ units. In an embodiment, the cyanophenol is p-cyanophenol, 3,4-dicyanophenol, or a combination comprising at least one of the foregoing phenols. In an embodiment, the branching agent groups are present in an amount of 0.75 to 5 branching units per 100 $R^1$ units.

In another embodiment, the branching agent has formula

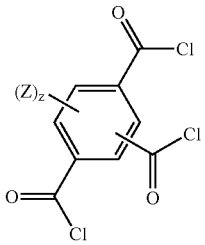

wherein z is 0, or the branching agent has formula

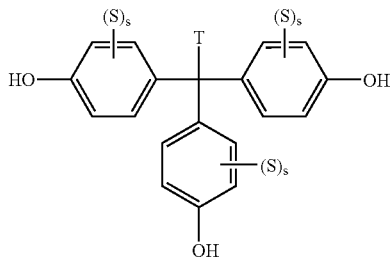

wherein T is methyl and s is 0.

In an embodiment, the composition has a haze of less than about 3%, measured using 1.0 mm plaques according to ASTM-D1003-00, or the composition has a haze of less than about 6%, measured using 3.2 mm plaques according to ASTM-D1003-00.

In an embodiment, an article is formed from the composition. In an embodiment, the article is capable of achieving a UL94 rating of V0 at a thickness of 1.5 mm. In another embodiment, the article is capable of achieving a UL94 rating of V0 at a thickness of 0.75 mm. In another embodiment, the article is capable of achieving a UL94 rating of 5VB at a thickness of 1.2 mm.

In another embodiment, the impact modifier is selected from the group consisting of ABS, MBS, Bulk ABS, AES, ASA, MABS, Polycarbonate-polysiloxane copolymer and combinations thereof.

The above described and other features are exemplified by the following drawings and detailed description.

BRIEF DESCRIPTION OF DRAWINGS

Referring now to the exemplary drawings.

DETAILED DESCRIPTION OF THE INVENTION

Figure 1:
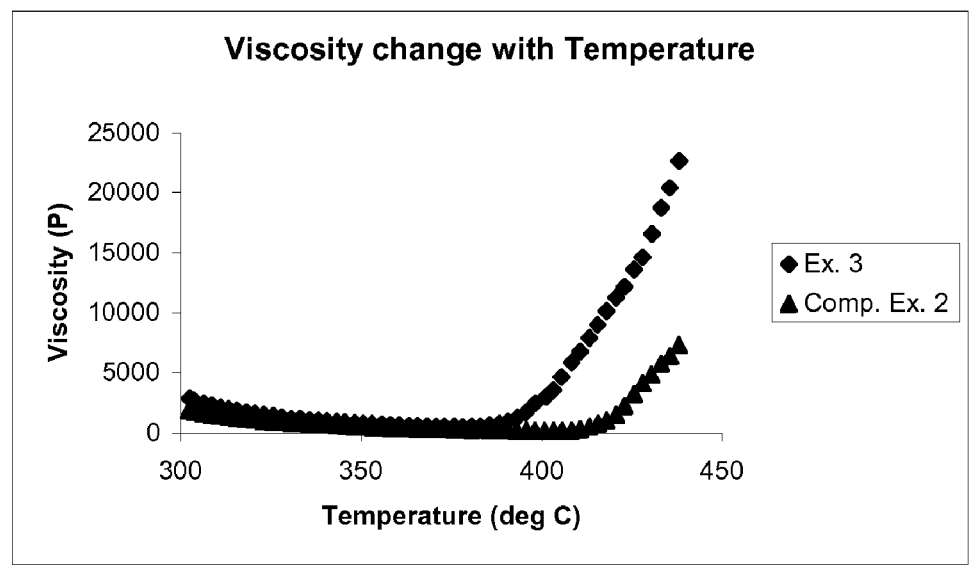
FIG. 1 is a graph showing viscosity versus temperature of a p-cyanophenyl endcapped polycarbonate and a p-cumylphenyl endcapped polycarbonate.

Surprisingly, it has been found by the inventors hereof that a transparent, flame retardant thermoplastic composition with improved flow properties can be obtained using a polycarbonate endcapped with cyanophenol, together with a flame retardant. It has also been found that when a specific cyanophenyl endcapped polycarbonate is used, in particular a polycarbonate-polyester-polysiloxane terpolymer, the terpolymer is transparent and has excellent flame retardancy even in the absence of a flame retardant additive. The compositions can further be manufactured to have excellent physical properties, including impact strength, dimensional stability, optical clarity, heat resistance, and/or melt processability. It is particularly advantageous to use a cyanophenol that is free of acid or amide groups to generate polycarbonates of controlled molecular weight and polydispersity. The compositions are useful in the manufacture of a wide variety of articles, particularly articles having a thin wall as described in more detail below.

Polycarbonates endcapped with a cyanophenyl carbonate groups (for convenience herein, "cyanophenyl endcapped polycarbonates") have repeating structural carbonate units of the formula (1):

wherein at least 60 percent of the total number of $R^1$ groups contains aromatic organic groups and the balance thereof are aliphatic, alicyclic, or aromatic groups. In one embodiment, each $R^1$ group is a divalent aromatic group, for example derived from an aromatic dihydroxy compound of the formula (3):

$$HO-A^1-Y^1-A^2-OH \qquad (3)$$

wherein each of $A^1$ and $A^2$ is a monocyclic divalent arylene group, and $Y^1$ is a single bond or a bridging group having one or two atoms that separate $A^1$ from $A^2$. In an exemplary embodiment, one atom separates $A^1$ from $A^2$. In another embodiment, when each of $A^1$ and $A^2$ is phenylene, $Y^1$ is para to each of the hydroxyl groups on the phenylenes. Illustrative non-limiting examples of groups of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ can be a hydrocarbon group or a saturated hydrocarbon group such as methylene, cyclohexylidene, or isopropylidene.

Included within the scope of formula (3) are bisphenol compounds of general formula (4):

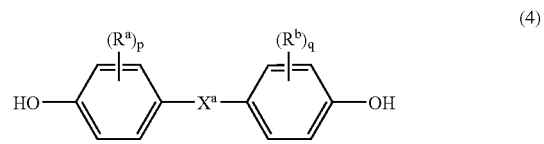

wherein $R^a$ and $R^b$ each represent a halogen atom or a monovalent hydrocarbon group and can be the same or different; p and q are each independently integers of 0 to 4; and $X^a$ represents a single bond or one of the groups of formulas (5) or (6):

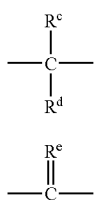

(5)

(6)

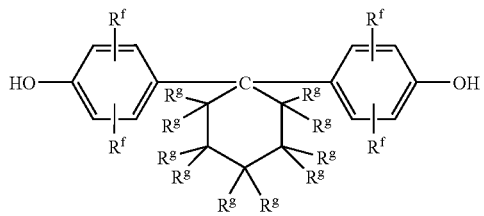

(8)

wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group. In particular, $R^c$ and $R^d$ are each the same hydrogen or $C_{1-4}$ alkyl group, specifically the same $C_{1-3}$ alkyl group, even more specifically, methyl.

In an embodiment, $R^c$ and $R^d$ taken together represent a $C_{3-20}$ cyclic alkylene group or a heteroatom-containing $C_{3-20}$ cyclic alkylene group comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing cyclic alkylene group comprises at least one heteroatom with a valency of 2 or greater, and at least two carbon atoms. Exemplary heteroatoms in the heteroatom-containing cyclic alkylene group include —O—, —S—, and —N(Z)—, where Z is a substituent group selected from hydrogen, hydroxy, $C_{1-12}$ alkyl, $C_{1-12}$ alkoxy, or $C_{1-12}$ acyl.

In a specific exemplary embodiment, $X^a$ is a substituted $C_{3-18}$ cycloalkylidene of the formula (7):

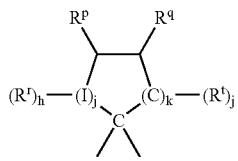

(7)

wherein each $R^r$, $R^p$, $R^q$, and $R^t$ is independently hydrogen, halogen, oxygen, or $C_{1-12}$ organic group; I is a direct bond, a carbon, or a divalent oxygen, sulfur, or —N(Z)— wherein Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (7) will have an unsaturated carbon-carbon linkage where the ring is fused. When k is 1 and i is 0, the ring as shown in formula (7) contains 4 carbon atoms, when k is 2, the ring as shown contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group.

When k is 3 and i is 0, bisphenols containing substituted or unsubstituted cyclohexane units are used, for example bisphenols of formula (8):

wherein each $R^f$ is independently hydrogen, $C_{1-12}$ alkyl, or halogen; and each $R^g$ is independently hydrogen or $C_{1-12}$ alkyl. The substituents can be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the APEC® trade name.

Other useful dihydroxy compounds having the formula HO—$R^1$—OH include aromatic dihydroxy compounds of formula (9):

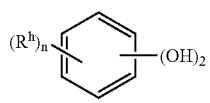

(9)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Some illustrative examples of dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantine, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9 to bis (4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds that can be represented by formula (3) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds can also be used.

"Polycarbonate" as used herein includes homopolycarbonates, copolymers comprising different $R^1$ moieties in the carbonate (referred to herein as "copolycarbonates"), and copolymers comprising carbonate units and other types of polymer units, such as ester units. In one specific embodiment, the polycarbonate is a linear homopolymer or copolymer comprising units derived from bisphenol A, in which each of $A^1$ and $A^2$ is p-phenylene and $Y^1$ is isopropylidene in formula (3). More specifically, at least 60%, particularly at least 80% of the $R^1$ groups in the polycarbonate are derived from bisphenol A.

Another specific type of copolymer is a polyester carbonate, also known as a polyester-polycarbonate. Such copolymers further contain, in addition to recurring carbonate chain units of the formula (1), repeating units of formula (10):

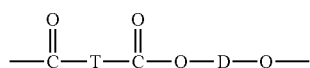

(10)

wherein D is a divalent group derived from a dihydroxy compound, and can be, for example, a $C_{2-10}$ alkylene group, a $C_{6-20}$ alicyclic group, a $C_{6-20}$ aromatic group or a polyoxyalkylene group in which the alkylene groups contain 2 to 6 carbon atoms, specifically 2, 3, or 4 carbon atoms; and T divalent group derived from a dicarboxylic acid, and can be, for example, a $C_{2-10}$ alkylene group, a $C_{6-20}$ alicyclic group, a $C_{6-20}$ alkyl aromatic group, or a $C_{6-20}$ aromatic group.

In one embodiment, D is a $C_{2-30}$ alkylene group having a straight chain, branched chain, or cyclic (including polycyclic) structure. In another embodiment, D is derived from an aromatic dihydroxy compound of formula (4) above. In another embodiment, D is derived from an aromatic dihydroxy compound of formula (9) above.

Examples of aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is 91:9 to 2:98. In another specific embodiment, D is a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers can vary broadly, for example 1:99 to 99:1, specifically 10:90 to 90:10, more specifically 25:75 to 75:25, depending on the desired properties of the final composition.

In a specific embodiment, the polyester unit of a polyester-polycarbonate can be derived from the reaction of a combination of isophthalic and terephthalic diacids (or derivatives thereof) with resorcinol. In another specific embodiment, the polyester unit of a polyester-polycarbonate is derived from the reaction of a combination of isophthalic acid and terephthalic acid with bisphenol-A. In a specific embodiment, the polycarbonate units are derived from bisphenol A. In another specific embodiment, the polycarbonate units are derived from resorcinol and bisphenol A in a molar ratio of resorcinol carbonate units to bisphenol A carbonate units of 1:99 to 99:1.

A specific example of a polycarbonate-polyester is a copolycarbonate-polyester-polysiloxane terpolymer comprising carbonate units of formula (1), ester units of formula (10), and polysiloxane (also referred to herein as "polydiorganosiloxane") units of formula (11):

(11)

wherein each occurrence of R is same or different, and is a $C_{1-13}$ monovalent organic group. For example, R may independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl, or $C_{7-13}$ alkylaryloxy group. The foregoing groups may be fully or partially halogenated with fluorine, chlorine, bromine, or iodine, or a combination thereof. Combinations of the foregoing R groups may be used in the same copolymer. In an embodiment, the polysiloxane comprises R groups that have a minimum hydrocarbon content. In a specific embodiment, an R group with a minimum hydrocarbon content is a methyl group.

The value of E in formula (11) may vary widely depending on the type and relative amount of each component in the thermoplastic composition, the desired properties of the composition, and like considerations. Herein, E has an average value of 4 to 50. In an embodiment, E has an average value of 16 to 50, specifically 20 to 45, and more specifically 25 to 45. In another embodiment, E has an average value of 4 to 15, specifically 5 to 15, more specifically 6 to 15, and still more specifically 7 to 12.

In an embodiment, polydiorganosiloxane units are derived from dihydroxy aromatic compound of formula (12):

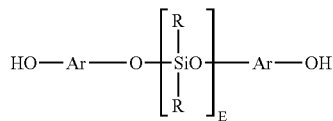

(12)

wherein E is as defined above; each R may independently be the same or different, and is as defined above; and each Ar may independently be the same or different, and is a substituted or unsubstituted $C_{6-30}$ arylene group, wherein the bonds are directly connected to an aromatic moiety. Suitable Ar groups in formula (12) may be derived from a $C_{6-30}$ dihydroxy aromatic compound, for example a dihydroxy aromatic compound of formula (3), (4), (8), or (9) above. Combinations comprising at least one of the foregoing dihydroxy aromatic compounds may also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl)methane, 1,1-bis(4-hydroxyphenyl)ethane, 2,2-bis(4-hydroxyphenyl) propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane. Combinations comprising at least one of the foregoing dihydroxy compounds may also be used. In an embodiment, the dihydroxy aromatic compound is unsubstituted, or is not substituted with non-aromatic hydrocarbon-containing substituents such as, for example, alkyl, alkoxy, or alkylene substituents.

In a specific embodiment, where Ar is derived from resorcinol, the polydiorganosiloxane repeating units are derived from dihydroxy aromatic compounds of formula (13):

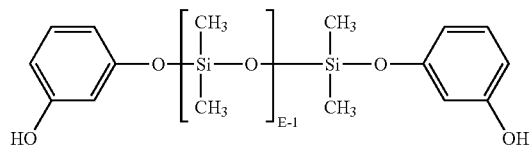

(13)

or, where Ar is derived from bisphenol-A, from dihydroxy aromatic compounds of formula (14):

wherein E is as defined above.

In another embodiment, polydiorganosiloxane units are derived from dihydroxy aromatic compound of formula (15):

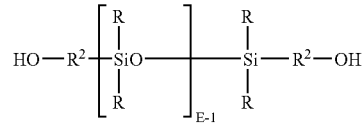

(15)

wherein R and E are as described above, and each occurrence of $R^2$ is independently a divalent $C_{1-30}$ alkylene or $C_{7-30}$ arylene-alkylene, and wherein the polymerized polysiloxane unit is the reaction residue of its corresponding dihydroxy aromatic compound. In a specific embodiment, where $R^2$ is $C_{7-30}$ arylene-alkylene, the polydiorganosiloxane units are derived from dihydroxy aromatic compound of formula (16):

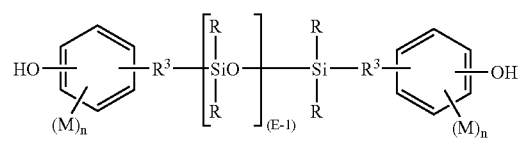

(16)

wherein R and E are as defined above. Each $R^3$ is independently a divalent $C_{2-8}$ aliphatic group. Each M may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4.

In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is 0 or 1, $R^3$ is a divalent $C_{1-3}$ aliphatic group, and R is methyl.

In a specific embodiment, the polydiorganosiloxane units are derived from a dihydroxy aromatic compound of formula (17):

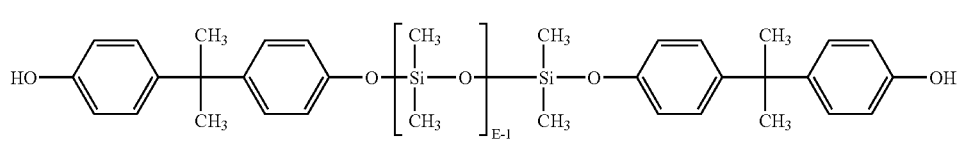

(14)

(17)

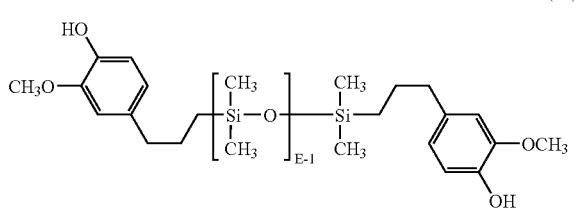

wherein E is as described above.

In another specific embodiment, the polydiorganosiloxane units are derived from dihydroxy aromatic compound of formula (18):

(18)

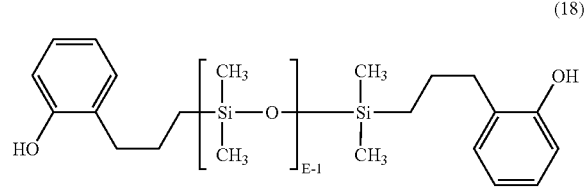

wherein E is as defined above.

Dihydroxy polysiloxanes typically can be made by functionalizing a substituted siloxane oligomer of formula (19):

(19)

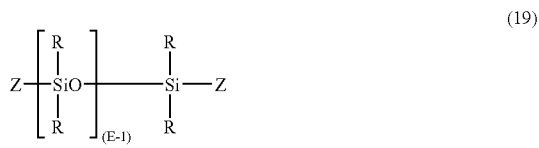

wherein R and E are as previously defined, and Z is H, halogen (Cl, Br, I), or carboxylate. Exemplary carboxylates include acetate, formate, benzoate, and the like. In an exemplary embodiment, where Z is H, compounds of formula (19) may be prepared by platinum catalyzed addition with an aliphatically unsaturated monohydric phenol. Suitable aliphatically unsaturated monohydric phenols included, for example, eugenol, 2-allylphenol, 4-allylphenol, 4-allyl-2-methylphenol, 4-allyl-2-phenylphenol, 4-allyl-2-bromophenol, 4-allyl-2-t-butoxyphenol, 4-phenyl-2-allylphenol, 2-methyl-4-propenylphenol, 2-allyl-4,6-dimethylphenol, 2-allyl-4-bromo-6-methylphenol, 2-allyl-6-methoxy-4-methylphenol, and 2-allyl-4,6-dimethylphenol. Combinations comprising at least one of the foregoing may also be used. Where Z is halogen or carboxylate, functionalization may be accomplished by reaction with a dihydroxy aromatic compound of formulas (3), (4), (8), (9), or a combination comprising at least one of the foregoing dihydroxy aromatic compounds. In an exemplary embodiment, compounds of formula (12) may be formed from an alpha,omega-bisacetoxypolydiorangonosiloxane and a dihydroxy aromatic compound under phase transfer conditions.

Specific copolycarbonate terpolymers include those with polycarbonate units of formula (1) wherein $R^1$ is a $C_{6-30}$ arylene group, polysiloxane units derived from siloxane diols of formula (14), (17) or (18), and polyester units wherein T is a $C_{6-30}$ arylene group. In an embodiment, T is derived from isophthalic and/or terephthalic acid, or reactive chemical equivalents thereof. In another embodiment, $R^1$ is derived from the carbonate reaction product of a resorcinol of formula (9), or a combination of a resorcinol of formula (9) and a bisphenol of formula (4).

The relative amount of each type of unit in the foregoing terpolymer will depend on the desired properties of the terpolymer, and are readily determined by one of ordinary skill in the art with out undue experimentation, using the guidelines provided herein. For example, the polycarbonate-polyester-polysiloxane terpolymer can comprise siloxane units in an amount of 0.1 to 25 weight percent (wt. %), specifically 0.2 to 10 wt. %, more specifically 0.2 to 6 wt. %, even more specifically 0.2 to 5 wt. %, and still more specifically 0.25 to 2 wt. %, based on the total weight of the polycarbonate-polyester-polysiloxane terpolymer, with the proviso that the siloxane units are provided by polysiloxane units covalently bonded in the polymer backbone of the polycarbonate-polyester-polysiloxane terpolymer. The polycarbonate-polyester-polysiloxane terpolymer can further comprise 0.1 to 49.85 wt. % carbonate units, 50 to 99.7 wt. % ester units, and 0.2 to 6 wt. % polysiloxane units, based on the total weight of the polysiloxane units, ester units, and carbonate units. Alternatively, the polycarbonate-polyester-polysiloxane terpolymer comprises 0.25 to 2 wt. % polysiloxane units, 60 to 96.75 wt. % ester units, and 3.25 to 39.75 wt. % carbonate units, based on the total weight of the polysiloxane units, ester units, and carbonate units.

Polycarbonates can be manufactured by processes such as interfacial polymerization and melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, triethylamine or a phase transfer catalyst, under controlled pH conditions, e.g., 8 to 11. The most commonly used water immiscible solvents include methylene chloride, 1,2-dichloroethane, chlorobenzene, toluene, and the like.

Exemplary carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an exemplary embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. An effective amount of a phase transfer catalyst can be 0.1 to 10 wt. % based on the weight of bisphenol in the phosgenation mixture. In another embodiment an effective amount of phase transfer catalyst can be 0.5 to 2 wt. % based on the weight of bisphenol in the phosgenation mixture.

Alternatively, melt processes can be used to make the cyanophenol endcapped polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing. In addition, useful transesterification catalyst for use can include phase transfer catalysts of formula $(R^3)_4Q^+X$ above, wherein each $R^3$, Q, and X are as defined above. Exemplary transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride (TMTC), tris-p-hydroxy phenyl ethane (THPE), 3,3-bis-(4-hydroxyphenyl)-oxindole (also known as isatin-bis-phenol), tris-phenol TC (1,3,5-tris((p-hydroxyphenyl)isopropyl)benzene), tris-phenol PA (4(4(1,1-bis(p-hydroxyphenyl)-ethyl) alpha,alpha-dimethyl benzyl)phenol), 4-chloroformyl phthalic anhydride, trimesic acid, and benzophenone tetracarboxylic acid. The branching agents can be added at a level of 0.05 to 2.0 wt. %. Mixtures comprising linear polycarbonates and branched polycarbonates can be used.

In some embodiments, a particular type of branching agent is used to create branched polycarbonate materials. These branched polycarbonate materials have statistically more than two end groups. The branching agent is added in an amount (relative to the bisphenol monomer) that is sufficient to achieve the desired branching content, that is, more than two end groups. The molecular weight of the polymer may become very high upon addition of the branching agent and may lead to viscosity problems during phosgenation. Therefore, in some embodiments, an increase in the amount of the chain termination agent is used in the polymerization. The amount of chain termination agent used when the particular branching agent is used is generally higher than if only a chain termination agent alone is used. The amount of chain termination agent used is generally above 5 mole percent and less than 20 mole percent compared to the bisphenol monomer.

In some embodiments, the branching agent is a structure derived from a triacid trichloride of the formula (21)

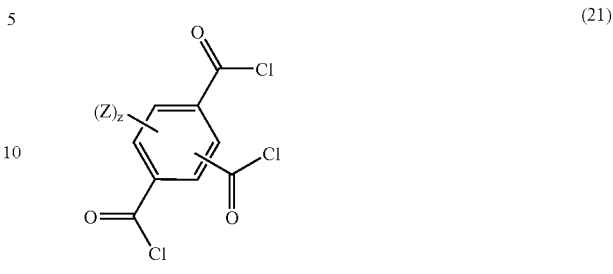

wherein Z is a halogen, $C_{1-3}$ alkyl group, $C_{1-3}$ alkoxy group, $C_{7-12}$ arylalkyl, alkylaryl, or nitro group, and z is 0 to 3; or a branching agent derived from a reaction with a tri-substituted phenol of the formula (22)

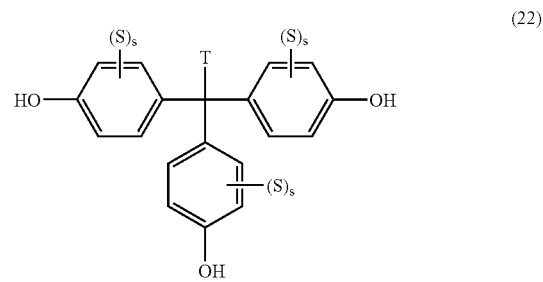

wherein T is a $C_{1-20}$ alkyl group, $C_{1-20}$ alkyleneoxy group, $C_{7-12}$ arylalkyl, or alkylaryl group, S is a halogen, $C_{1-3}$ alkyl group, $C_{1-3}$ alkoxy group, $C_{7-12}$ arylalkyl, alkylaryl, or nitro group, s is 0 to 4.

In another embodiment, the branching agent is a structure having formula (23)

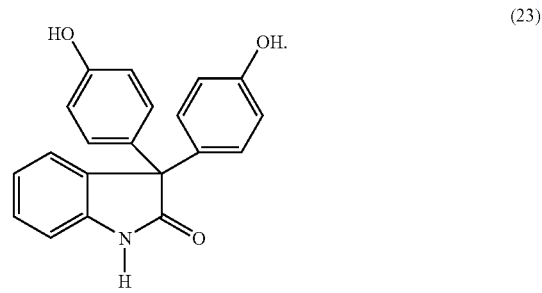

Examples of specific branching agents that are particularly effective in the compositions include trimellitic trichloride (TMTC), tris-p-hydroxy phenyl ethane (THPE) and isatin-bis-phenol. In one embodiment, in formula (21), z is 0. In another embodiment, in formula (22), T is methyl and s is 0.

The relative amount of branching agents used in the manufacture of the polymer will depend on a number of considerations, for example the type of $R^1$ groups, the amount of cyanophenol, and the desired molecular weight of the polycarbonate. In general, the amount of branching agent is effective to provide about 0.1 to 10 branching units per 100 $R^1$ units, specifically about 0.5 to 8 branching units per 100 $R^1$ units, and more specifically about 0.75 to 5 branching units per 100 R¹ units, while in other embodiments, the amount of branching agent is effective to provide about 0.3 to 6 branching units per 100 R¹ units. For branching agents having formula (21), the amount of branching agent tri-ester groups are present in an amount of about 0.1 to 10 branching units per 100 R¹ units, specifically about 0.5 to 8 branching units per 100 R¹ units, and more specifically about 0.75 to 5 tri-ester units per 100 R¹ units. For branching agents having formula (22), the amount of branching agent tricarbonate groups are present in an amount of about 0.1 to 10 branching units per 100 R¹ units, specifically about 0.5 to 8 branching units per 100 R¹ units, and more specifically about 0.75 to 5 tri-phenylcarbonate units per 100 R¹ units. In some embodiments, a combination of two or more branching agents may be used.

In order to obtain a cyanophenyl endcapped polycarbonate, a cyanophenol is included as an endcapping agent (also referred to as a capping or chain stopping agent) during polymerization. Suitable cyanophenols are of formula (2)

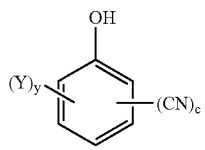

(2)

wherein Y is a halogen, $C_{1-3}$ alkyl group, $C_{1-3}$ alkoxy group, $C_{7-12}$ arylalkyl, $C_{7-12}$ alkylaryl, or nitro group, y is 0 to 4, and c is 1 to 5, provided that y+c is 1 to 5. In one embodiment y is 1 to 2 and c is 1 to 2. In another embodiment, y is 0 and c is 1 to 2. Two specific cyanophenols are p-cyanophenol and 3,4-dicyanophenol.

The cyanophenols can be added to the polymerization reaction as an endcapping agent using conventionally know processes. In one embodiment it is advantageous to decrease, minimize, or prevent contact between the cyanophenol and components that result in cyanophenol byproducts, in particular the corresponding carboxylic acids and/or amides. For example, it is common to add endcapping agents as part of a warm aqueous solution of a caustic (i.e., alkali and alkaline earth metal hydroxides such as sodium hydroxide dissolved in water). If such contact occurs, side products can form, such as the corresponding hydroxybenzamide and/or hydroxybenzoic acid. Such side products tend to be insoluble or otherwise incompatible with the interfacial reaction, and can also cause error in obtaining the target molecular weight of the polycarbonate.

It has accordingly been found useful to modify the reaction conditions employed to produce the endcapped polycarbonates so as to use cyanophenols that are essentially free of acid and amide groups. As used herein, "essentially free of" acid and amide groups means that the total number of acid and amide end groups are less than that detectable by Fourier transform infrared (FT-IR) analysis of the p-cyanophenol prior to addition to the polycarbonate reaction. Addition of the cyanophenol as a component in a warm aqueous solution of caustic is therefore to be avoided.

Other endcapping agents can also be used with phenol containing a cyano substituent, provided that such agents do not significantly adversely affect the desired properties of the compositions, such as transparency, ductility, flame retardance, and the like. In one embodiment only a cyanophenol, specifically p-cyanophenol, is used as an endcapping agent. Exemplary additional chain stoppers include certain other mono-phenolic compounds, mono-carboxylic acid chlorides, and/or mono-chloroformates. Mono-phenolic chain stoppers are exemplified by monocyclic phenols such as phenol and $C_1-C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atoms can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used with cyanophenols as chain stopping agents. These include monocyclic, mono-carboxylic acid chlorides such as benzoyl chloride, $C_1-C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof, polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

The relative amount of cyanophenol used in the manufacture of the polymer will depend on a number of considerations, for example the type of R¹ groups, the use of a branching agent, and the desired molecular weight of the polycarbonate. In general, the amount of cyanophenol is effective to provide 1 to 9 cyanophenyl carbonate units per 100 R¹ units, specifically 2 to 8 cyanophenyl carbonate units per 100 R¹ units, and more specifically 2.5 to 7 cyanophenyl carbonate units per 100 R¹ units. Up to about half of the cyanophenyl carbonate units can be replaced by a different type of endcapping unit as described above.

When a branching agent is used in combination with a cyanophenol in the manufacture of the polymer, the relative amount of cyanophenol used in the manufacture of the polymer will depend on a number of considerations, for example the type of R¹ groups, the use and amount of the branching agent, and the desired molecular weight of the polycarbonate. In general, the amount of cyanophenol is effective to provide 1 to 20 cyanophenyl carbonate units per 100 R¹ units, specifically 2 to 20 cyanophenyl carbonate units per 100 R¹ units, more specifically 2 to 15 cyanophenyl carbonate units per 100 R¹ units, and even more specifically 3 to 12 cyanophenyl carbonate units per 100 R¹ units. Up to about half of the cyanophenyl carbonate units can be replaced by a different type of endcapping unit as described above.

The cyanophenyl endcapped polycarbonates can have a weight average molecular weight of about 5,000 to about 200,000, specifically about 10,000 to about 100,000, even more specifically 15,000 to 60,000, still more specifically about 16,000 to 45,000 grams per mole (g/mol) as measured by gel permeation chromatography (GPC), using a crosslinked styrene-divinylbenzene column and calibrated to polycarbonate references. GPC samples are prepared at a concentration of about 1 mg/ml, and are eluted at a flow rate of about 1.5 ml/min. When a branching agent is used, the cyanophenyl endcapped polycarbonates can have a weight average molecular weight of about 5,000 to about 200,000, specifically about 10,000 to about 100,000, even more specifically 15,000 to 80,000, still more specifically about 16,000 to 60,000 grams per mole (g/mol) as measured by gel permeation chromatography (GPC), using a crosslinked styrene-divinylbenzene column and calibrated to polycarbonate references. GPC samples are prepared at a concentration of about 1 mg/ml, and are eluted at a flow rate of about 1.5 ml/min.

Melt volume flow rate (often abbreviated "MVR") measures the rate of extrusion of a thermoplastic through an orifice at a prescribed temperature and load. The cyanophenyl endcapped polycarbonates can have an MVR, measured at 300° C. under a load of 1.2 kg, of 0.1 to 200 cubic centimeters per 10 minutes ($cm^3/10$ min), specifically 1 to 100 $cm^3/10$ min.

The cyanophenyl endcapped polycarbonates and compositions comprising the polycarbonates and flame retardants can have excellent flame retardant properties. In a surprising feature, it has been found that the cyanophenyl endcapped polycarbonates themselves can be inherently more flame retardant than the same polycarbonates without the cyanophenyl endcapping.

To provide even higher flame retardancy, the thermoplastic compositions can comprise a flame retardant in addition to the cyanophenyl endcapped polycarbonate. Useful flame retardant additives include, for example, flame retardant salts such as alkali metal salts of perfluorinated $C_{1-16}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS, alone or in combination with other flame retardants, are particularly useful in the polycarbonate compositions disclosed herein.

Useful flame retardant additives also include organic compounds that include phosphorus, bromine, and/or chlorine. Non-brominated and non-chlorinated phosphorus-containing flame retardants can be used in certain applications for regulatory reasons, for example organic phosphates and organic compounds containing phosphorus-nitrogen bonds. One type of exemplary organic phosphate is an aromatic phosphate of the formula $(GO)_3P=O$, wherein each G is independently an alkyl, cycloalkyl, aryl, alkylaryl, or arylalkyl group, provided that at least one G is an aromatic group. Two of the G groups can be joined together to provide a cyclic group, for example, diphenyl pentaerythritol diphosphate. Exemplary aromatic phosphates include, phenyl bis(dodecyl)phosphate, phenyl bis(neopentyl)phosphate, phenyl bis(3,5,5'-trimethylhexyl) phosphate, ethyl diphenyl phosphate, 2-ethylhexyl di(p-tolyl) phosphate, bis(2-ethylhexyl)p-tolyl phosphate, tritolyl phosphate, bis(2-ethylhexyl)phenyl phosphate, tri(nonylphenyl) phosphate, bis(dodecyl)p-tolyl phosphate, dibutyl phenyl phosphate, 2-chloroethyl diphenyl phosphate, p-tolyl bis(2, 5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or poly-functional aromatic phosphorus-containing compounds are also useful, for example, compounds of the formulas below:

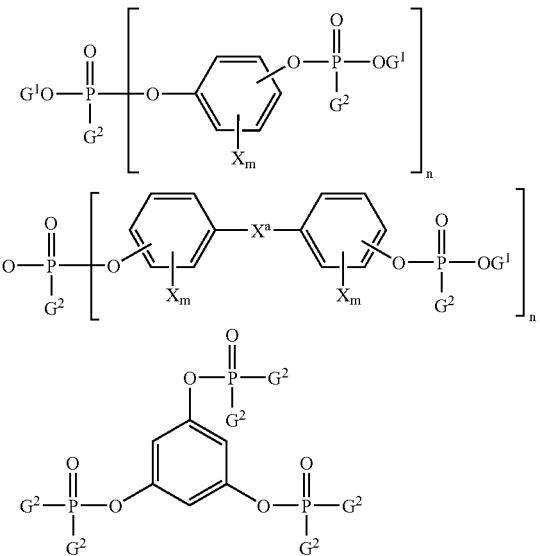

wherein each $G^1$ is independently a hydrocarbon having 1 to 30 carbon atoms; each $G^2$ is independently a hydrocarbon or hydrocarbonoxy having 1 to 30 carbon atoms; each X is independently a bromine or chlorine; m is 0 to 4, and n is 1 to 30. Exemplary di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A, respectively, their oligomeric and polymeric counterparts, and the like.

Exemplary flame retardant additives containing phosphorus-nitrogen bonds include phosphonitrilic chloride, phosphorus ester amides, phosphoric acid amides, phosphonic acid amides, phosphinic acid amides, tris(aziridinyl)phosphine oxide.

Halogenated organic flame retardant compounds can also be used as flame retardants, for example halogenated flame retardant compounds of formula (20):

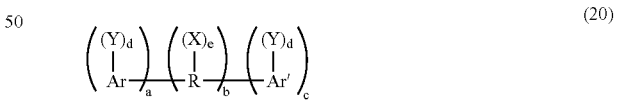

(20)

wherein R is a $C_{1-36}$ alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur-containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (20) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OB, wherein B is a monovalent hydrocarbon group similar to X or (3) monovalent hydrocarbon groups of the type represented by R or (4) other substituents, e.g., nitro, cyano, and the like, said substituents being essentially inert provided that there is greater than or equal to one, specifically greater than or equal to two, halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group can itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c can be 0. Otherwise either a or c, but not both, can be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Another useful class of flame retardant is the class of cyclic siloxanes having the general formula $(R_2SiO)_y$ wherein R is a monovalent hydrocarbon or fluorinated hydrocarbon having from 1 to 18 carbon atoms and y is a number from 3 to 12. Examples of fluorinated hydrocarbon include, but are not limited to, 3-fluoropropyl, 3,3,3-trifluoropropyl, 5,5,5,4,4,3,3-heptafluoropentyl, fluorophenyl, difluorophenyl and trifluorotolyl. Examples of suitable cyclic siloxanes include, but are not limited to, octamethylcyclotetrasiloxane, 1,2,3,4-tetramethyl-1,2,3,4-tetravinylcyclotetrasiloxane, 1,2,3,4-tetramethyl-1,2,3,4-tetraphenylcyclotetrasiloxane, octaethylcyclotetrasiloxane, octapropylcyclotetrasiloxane, octabutylcyclotetrasiloxane, decamethylcyclopentasiloxane, dodecamethylcyclohexasiloxane, tetradecamethylcycloheptasiloxane, hexadecamethylcyclooctasiloxane, eicosamethylcyclodecasiloxane, octaphenylcyclotetrasiloxane, and the like. A particularly useful cyclic siloxane is octaphenylcyclotetrasiloxane.

When present, the foregoing flame retardant additives are generally present in amounts of 0.01 to 10 wt. %, more specifically 0.02 to 5 wt. %, based on 100 parts by weight of the polymer component of the thermoplastic composition.

In addition to the cyanophenyl endcapped polycarbonates described above, the thermoplastic compositions can also comprise other thermoplastic polymers, for example polyesters, polyamides, and other polycarbonate homopolymers and copolymers, including polycarbonate-polysiloxane copolymers and polyester carbonates, also known as a polyester-polycarbonates, and polyesters. The polymer component of such compositions can comprise 1 to 99 wt %, specifically 10 to 90, more specifically 20 to 80 wt % of the cyanophenyl endcapped polycarbonate, with the remainder of the polymer component being other polymers.

For example, the thermoplastic composition can further include an impact modifier(s), with the proviso that the additives are selected so as to not significantly adversely affect the desired properties of the thermoplastic composition. Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

A specific type of impact modifier is an elastomer-modified graft copolymer comprising (i) an elastomeric (i.e., rubbery) polymer substrate having a glass transition temperature ($T_g$) less than 10° C., more specifically less than −10° C., or more specifically −400° to −80° C., and (ii) a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl (meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate. As used herein, the term "(meth)acrylate" encompasses both acrylate and methacrylate groups.

Specific exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

Impact modifiers, when present, are generally present in amounts of 1 to 30 wt. %, based on 100 parts by weight of the polymer component of the thermoplastic composition.

In addition to the cyanophenyl endcapped polycarbonate and flame retardant (and any impact modifier, if used), the thermoplastic composition can include various additives ordinarily incorporated in polycarbonate compositions of this type, with the proviso that the additives are selected so as to not significantly adversely affect the desired properties of the polycarbonate, for example, transparency and flame retardance. Combinations of additives can be used. Such additives can be mixed at a suitable time during the mixing of the components for forming the composition.

Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (atmospheres), or the like; kaolin, including hard kaolin, soft kaolin, calcined kaolin, kaolin comprising various coatings known in the art to facilitate compatibility with the polycarbonate polymeric matrix, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly (phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents can be coated with a layer of metallic material to facilitate conductivity, or surface treated with silanes to improve adhesion and dispersion with the polycarbonate polymeric matrix. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of 0 to 80 parts by weight, based on 100 parts by weight of the polymer component of the composition.

Exemplary antioxidant additives include, for example, organophosphites such as tris(nonyl phenyl)phosphite, tris(2,4-di-t-butylphenyl)phosphite ("IRGAFOS 168" or "I-168"), bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations comprising at least one of the foregoing antioxidants. Antioxidants are generally used in amounts of 0.0001 to 1 part by weight, based on 100 parts by weigh of the polymer component of the thermoplastic composition (excluding any filler).

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of 0.0001 to 1 part by weight, based on 100 parts by weight of the polymer component of the thermoplastic composition.

Light stabilizers and/or ultraviolet light (UV) absorbing additives can also be used. Exemplary light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of 0.0001 to 1 parts by weight, based on 100 parts by weight of the polymer component of the thermoplastic composition.

Exemplary UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl) oxy]-2,2-bis[[(2-cyano-3,3-diphenylacryloyl)oxy]methyl] propane (UVINUL® 3030); 2,2'-(1,4-phenylene)bis(4H-3,1-benzoxazin-4-one); 1,3-bis[(2-cyano-3,3-diphenylacryloyl) oxy]-2,2-bis[[(2-cyano-3,3-diphenylacryloyl)oxy]methyl] propane; nano-size inorganic materials such as titanium oxide, cerium oxide, and zinc oxide, all with particle size less than or equal to 100 nanometers; or the like, or combinations comprising at least one of the foregoing UV absorbers. UV absorbers are generally used in amounts of 0.0001 to 1 part by weight, based on 100 parts by weight of the polymer component of the thermoplastic composition.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.001 to 1 part by weight, specifically 0.01 to 0.75 part by weight, more specifically 0.1 to 0.5 part by weight, based on 100 parts by weight of the polymer component of the thermoplastic composition.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT® 6321 (Sanyo) or PEBAX® MH1657 (Atofina), IRGASTAT® P18 and P22 (Ciba-Geigy). Other polymeric materials that can be used as antistatic agents are inherently conducting polymers such as polyaniline (commercially available as PANIPOL® EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or a combination comprising at least one of the foregoing can be used in a polymeric resin containing chemical antistatic agents to render the composition electrostatically dissipative. Antistatic agents are generally used in amounts of 0.0001 to 5 parts by weight, based on 100 parts by weight of the polymer component of the thermoplastic composition.

Colorants such as pigment and/or dye additives can also be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of 0.01 to 10 parts by weight, based on 100 parts by weight of the polymer component of the thermoplastic composition.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.01 to 10 parts by weight, based on 100 parts by weight of the polymer component of the thermoplastic composition.

Where a foam is desired, useful blowing agents include, for example, low boiling halohydrocarbons and those that generate carbon dioxide; blowing agents that are solid at room temperature and when heated to temperatures higher than their decomposition temperature, generate gases such as nitrogen, carbon dioxide, and ammonia gas, such as azodicarbonamide, metal salts of azodicarbonamide, 4,4' oxybis (benzenesulfonylhydrazide), sodium bicarbonate, ammonium carbonate, or the like, or combinations comprising at least one of the foregoing blowing agents. Blowing agents are generally used in amounts of 0.01 to 20 parts by weight, based on 100 parts by weight of the polymer component of the thermoplastic composition.

Anti-drip agents can also be used in the thermoplastic composition, for example a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise 50 wt. % PTFE and 50 wt. % SAN, based on the total weight of the encapsulated fluoropolymer. The SAN can comprise, for example, 75 wt. % styrene and 25 wt. % acrylonitrile based on the total weight of the copolymer. Alternatively, the fluoropolymer can be pre-blended in some manner with a second polymer, such as for, example, an aromatic polycarbonate or SAN to form an agglomerated material for use as an anti-drip agent. Either method can be used to produce an encapsulated fluoropolymer. Antidrip agents are generally used in amounts of 0.1 to 5 percent by weight, based on 100 parts by weight of the polymer component of the thermoplastic composition.

Radiation stabilizers can also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9 to decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group ($-CH_2OH$) or it can be a member of a more complex hydrocarbon group such as $-CR^4HOH$ or $-CR_2^4OH$ wherein $R^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.1 to 10 parts by weight based on 100 parts by weight of the polymer component of the thermoplastic composition.

Thermoplastic compositions comprising the cyanophenyl endcapped polycarbonates and flame retardants can be manufactured by various methods. For example, cyanophenyl endcapped polycarbonate, flame retardant, impact modifier (if present), and/or other optional components are first blended in a HENSCHEL-Mixer® high speed mixer. Other low shear processes, including but not limited to hand mixing, can also accomplish this blending. The blend is then fed into the throat of a single or twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

In some embodiments described above, the onset of high-temperature cross-linking can be controlled by adjusting the molecular weight of the cyanophenyl endcapped polycarbonate or by the addition of certain flame retardant salts, in particular alkali metal salts of perfluorinated $C_{1-16}$ alkyl sulfonates. In one embodiment, the addition of an inorganic flame retardant (e.g., KSS) increases the temperature of the onset of cross-linking/branching in the polycarbonate by 20 to 80° C., specifically 40 to 60° C.

In another embodiment, a composition comprising cyanophenyl endcapped polycarbonate having a Mw of 30,000 or higher exhibits less crosslinking or branching than a cyanophenyl endcapped polycarbonate having a Mw of 22,000 or 25,000 at high temperatures, for example, 280° C. or above, 300° C. or above, or 320° C. or above.

Based on the characteristics of the cyanophenyl endcapped polycarbonates, compositions comprising the polycarbonates can have desirable rheologies, such as an increase in viscosity at high temperatures. For example, the thermoplastic compositions can have an increase in viscosity of 50 to 10,000 poise (P), more specifically, 100 to 5,000 P, when held at temperatures of 300° C., 320° C., or 340° C. for thirty minutes at a parallel plate shear rate of 10 rad/sec.

Alternatively, or in addition, compositions comprising the cyanophenyl endcapped polycarbonates can have a melt volume ratio (MVR) of 1 to 50, more specifically 5 to 30 cm$^3$/10 minutes, measured at 300° C. under a load of 1.2 kg in accordance with ASTM D1238-04.

In one embodiment, the thermoplastic composition comprising a cyanophenyl endcapped polycarbonate has a greater than 10 percent viscosity increase when held at 300° C. or higher, than the same composition comprising polycarbonate manufactured with a different endcapping group.

Shaped, formed, or molded articles comprising the thermoplastic compositions are also provided. The thermoplastic compositions can be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, battery packs, electrical connectors, and components of lighting fixtures, ornaments, home appliances, roofs, greenhouses, sun rooms, swimming pool enclosures, and the like. The compositions are of particular utility in the manufacture of thin walled articles such as housings for electronic devices. Additional examples of articles that can be formed from the compositions include electrical parts, such as relays, and enclosures, consumer electronics such as enclosures and parts for laptops, desktops, docking stations, PDAs, digital cameras, desktops, and telecommunications parts such as parts for base station terminals.

Articles molded from thermoplastic compositions comprising the cyanophenyl endcapped polycarbonates can have a heat deflection temperature (HDT) of 100 to 300° C., more specifically 110 to 200° C., measured at 0.455 MPa according to ASTM D648.

Articles molded from thermoplastic composition comprising the cyanophenyl endcapped polycarbonates can further have a percent ductility of 10 to 100%, or 20 to 100%, measured in accordance with ASTM 256. In other embodiments, where a branching agent is used, articles molded from thermoplastic composition comprising the cyanophenyl endcapped polycarbonates can further have a percent ductility of 0 to 100%, or 20 to 100%, measured in accordance with ASTM 256.

Articles molded from thermoplastic compositions comprising the cyanophenyl endcapped polycarbonates can have a Notched Izod Impact (NII) of 1 to 15 feet to pounds (ft-lb)/inch, or 2 to 14 ft-lb/inch, measured at 23° C. using ⅛-inch thick bars (3.2 mm) in accordance with ASTM D256. In other embodiments, where a branching agent is used, articles molded from thermoplastic compositions comprising the cyanophenyl endcapped polycarbonates can have a Notched Izod Impact (NII) of 0.2 to 15 feet to pounds (ft-lb)/inch, or 0.5 to 14 ft-lb/inch, measured at 23° C. using ⅛-inch thick bars (3.2 mm) in accordance with ASTM D256.

Articles molded from compositions comprising the cyanophenyl endcapped polycarbonates can have a transparency of 60 to 90%, or more specifically, 70 to 90%, measured using 3.2 mm thick plaques according to ASTM-D1003-00. The thermoplastic compositions can have a haze value of less than 10%, more specifically, less than 5%, as measured using 3.2 mm thick plaques according to ASTM-D1003-00.

In some embodiments, where a branching agent is used, the thermoplastic compositions can have a haze value of less than 5%, more specifically, less than 3%, as measured using 1.0 mm thick plaques according to ASTM-D1003-00. Additionally, the thermoplastic compositions can have a haze value of less than 20%, more specifically, less than 10%, even more specifically, less than 6% as measured using 3.2 mm thick plaques according to ASTM-D1003-00.

Thermoplastic compositions comprising the cyanophenyl endcapped polycarbonates and a flame retardant can have an UL94 rating of V2 or better, specifically, V1 or better, or more specifically, V0.

Thermoplastic compositions comprising the cyanophenyl endcapped polycarbonates, a branching agent, and a flame retardant can have an UL94 rating of V2 or better, specifically, V1 or better, or more specifically, V0.

Based on their advantageous flow and processability, the cyanophenyl endcapped polycarbonates are useful for the manufacture of thin-walled parts, in particular flame retardant thin-walled parts. As used herein an article having a "thin wall" means an article wherein a portion of the article has a thickness of 0.01 mm to 3.0 mm, more specifically, 0.05 to 2.5 mm, or even more specifically, 0.1 to 2.0 mm. Without being bound by theory, the thin-wall flame retardant performance may be attributed to a build-up of viscosity at high temperatures, such as the temperature inside the flame. For example, time-sweep rheology curves at 300, 320, and 340° C. (30 minutes hold times) show an increase in viscosity for all of the polycarbonate materials with cyanophenyl carbonate end groups.

In a particularly advantageous embodiment, an article having a wall with a thickness of 3 mm has a UL94 rating of V2 or better, specifically V1 or better, more specifically, V0. In another embodiment, an article having a wall with a thickness of 2.5 mm has a UL94 rating of V2 or better, specifically V1 or better, more specifically, V0. In another embodiment, an article having a wall with a thickness of 2.2 mm has a UL94 rating of V2 or better, specifically V1 or better, more specifically, V0. In another embodiment, an article having a wall with a thickness of 2 mm has a UL94 rating of V2 or better, specifically V1 or better, more specifically, V0. In another embodiment, an article having a wall with a thickness of 1.57 mm has a UL94 rating of V2 or better, specifically V1 or better, more specifically, V0.

The cyanophenyl endcapped polycarbonates, particularly the terpolymer copolyester carbonates containing polysiloxane units can be used to manufacture components used in a confined or sealed area, such as the interior of an aircraft. For such applications, various flame retardant properties are of high importance. In the airline transportation industry, useful flame retardant properties, in particular the heat release rate, of thermoplastic materials is typically measured and regulated according to Federal Aviation Regulations (FARs), in particular FAR/JAR 25.853 (d). The heat release rate standard described in FAR F25.4 (FAR Section 25, Appendix F, Part IV) is one such specified property. In one embodiment, thermoplastic compositions comprising the cyanophenyl endcapped polycarbonates have a 2 minute integrated heat release rate of less than or equal to 65 kilowatt-minutes per square meter (kW-min/m$^2$) and a peak heat release rate of less than 65 kilowatts per square meter (kW/m$^2$) determined using the Ohio State University calorimeter, abbreviated as OSU 65/65 (2 min/peak). In another embodiment, thermoplastic compositions comprising the cyanophenyl endcapped polycarbonates have a 2 minute integrated heat release rate of less than or equal to 55 kW-min/m$^2$ and a peak heat release rate of less than 55 kW/m$^2$ (abbreviated as OSU 55/55). In addition thermoplastic compositions comprising the cyanophenyl endcapped polycarbonates can have a smoke density ($D_s$) as described in FAR F25.5 (FAR Section 25, Appendix F, Part V) of less than 200, measured after 4 minutes in either flame or non-flame scenario, according to ASTM F814-83.

The invention is further illustrated by the following non-limiting examples.

EXAMPLES

The materials listed in Table 1 were used in the following examples.

TABLE 1

| Acronym | Chemical name | Supplier |
|---|---|---|
| PC-A | p-Cumylphenyl carbonate endcapped BPA polycarbonate (Mw = 30,000 g/mol) | GE Plastics |
| PC-B | p-Cumylphenyl carbonate endcapped BPA polycarbonate (Mw = 25,900 g/mol) | GE Plastics |
| PC-C | p-Cumylphenyl carbonate endcapped BPA polycarbonate (Mw = 36,500 g/mol) | GE Plastics |
| (I) | Eugenol-capped siloxane of formula (17) wherein E is about 12 | GE Plastics |
| PETS | Pentaerythritol tetrastearate (plasticizer/mold release agent) | FACI Farasco-Genova Italy |
| I-168 | Tris (2,4-di-tert-butylphenyl)phosphite (Antioxidant) | Ciba Specialty Chemicals |
| TSAN | Polytetrafluoroethylene (PTFE) encapsulated by a styrene-acrylonitrile copolymer (SAN) (Anti-drip agent) | GE Plastics |
| FR-1 | Potassium perfluorobutane sulfonate (Rimar salt) | 3M |
| FR-2 | Potassium diphenyl sulfone-3-sulfonate (KSS) | Sloss, Inc. |

All thermoplastic compositions except where indicated were compounded on a Werner & Pfleiderer co-rotating twin screw extruder (Length/Diameter (L/D) ratio=30/1, vacuum port located near die face), with enough distributive and dispersive mixing elements to produce good mixing between the components of the polymer compositions. The compositions were subsequently molded according to ISO 294 on a Husky or BOY injection-molding machine. Compositions were compounded and molded at a temperature of 270 to 330° C., although it will be recognized by one skilled in the art that the method is not be limited to these temperatures.

Physical measurements were made using the test methods referenced above.

Flammability tests were performed following the procedure of Underwriter's Laboratory Bulletin 94 entitled "Tests for Flammability of Plastic Materials, UL94." Several ratings can be applied based on the rate of burning, time to extinguish, ability to resist dripping, and whether or not drips are burning. According to this procedure, materials can be classified as UL94 HB, V0, V1, V2, 5VA, and/or 5VB on the basis of the test results obtained for five samples. The criteria for each of these flammability classifications are described below.

HB: In a 5-inch sample, placed so that the long axis of the sample is horizontal to the flame, the rate of burn of the sample is less than 3 inches per minute, and the flame is extinguished before 4 inches of sample are burned.

V0: In a sample placed so that its long axis is 180 degrees to the flame, the average period of flaming and/or smoldering after removing the igniting flame does not exceed ten seconds and none of the vertically placed samples produces drips of burning particles that ignite absorbent cotton. Five bar flame out time (FOT) is the sum of the flame out time for five bars, each lit twice for a maximum flame out time of 50 seconds.

V1: In a sample placed so that its long axis is 180 degrees to the flame, the average period of flaming and/or smoldering after removing the igniting flame does not exceed twenty-five seconds and none of the vertically placed samples produces drips of burning particles that ignite absorbent cotton. Five bar flame out time is the sum of the flame out time for five bars, each lit twice for a maximum flame out time of 250 seconds.

V2: In a sample placed so that its long axis is 180 degrees to the flame, the average period of flaming and/or smoldering after removing the igniting flame does not exceed twenty-five seconds, but the vertically placed samples produce drips of burning particles that ignite cotton. Five bar flame out time is the sum of the flame out time for five bars, each lit twice for a maximum flame out time of 250 seconds.

Examples 1 to 8

These examples illustrate the preparation of p-cyanophenyl endcapped BPA polycarbonates (PC-1 to PC-8). Amounts and product characteristics are shown in Table 2.

In Examples 1 to 3, the following process was used to produce linear p-cyanophenol endcapped polycarbonates. To a 300-gallon glass reactor equipped with condenser, agitator, pH probe, phosgene inlet, caustic inlet, and recirculation loops were charged bisphenol A (BPA), p-cyanophenol (pre-dissolved into methylene chloride at approximately 2-3 wt %), sodium gluconate, triethylamine, water, and methylene chloride in amounts shown in Table 2a. Phosgene was co-fed with sodium hydroxide (50% w/w) to the reactor under ratio-pH control. The phosgene addition rate was maintained at 250 lbs/hr (113.4 kg/hr). The sodium hydroxide/phosgene ratio profile was set to achieve a target pH of 9 to 11. The resultant solution of p-cyanophenyl endcapped polycarbonate in methylene chloride was purified by acid wash and subsequent water washes. The final p-cyanophenyl endcapped polycarbonate was isolated by steam precipitation and dried under a stream of hot nitrogen. The molecular weights of the resulting polycarbonates (PC-1, PC-2, and PC-3) are shown in Table 2a.

In Examples 4 to 8, the following process was used to produce branched p-cyanophenol endcapped polycarbonates. To a 300-gallon glass reactor equipped with condenser, agitator, pH probe, phosgene inlet, caustic inlet, and recirculation loops were charged BPA, p-cyanophenol (pre-dissolved into methylene chloride at approximately 2-3 wt %), tris (hydroxyphenyl)ethane (THPE) (pre-dissolved into 200 g of 50% sodium hydroxide and diluted with deionized water to 2 kg of total solution), sodium gluconate, triethylamine, water, and methylene chloride in amounts as shown in Table 2a. Phosgene was co-fed with sodium hydroxide (50% w/w) to the reactor under ratio-pH control. The phosgene addition rate was maintained at 250 lbs/hr (113.4 kg/hr). The sodium hydroxide/phosgene ratio profile was set to achieve a target pH of 9 to 11. The resultant solution of p-cyanophenyl endcapped polycarbonate in methylene chloride was purified by acid wash and subsequent water washes. The final cyanophenyl endcapped polycarbonates were isolated by steam precipitation and dried under a stream of hot nitrogen. The molecular weights of the resulting polycarbonates (PC-4 to PC-8) are shown in Table 2a.

TABLE 2a

| Component | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- |
| Bisphenol A, kg | 68 | 68 | 68 | 68 | 68 | 68 | 68 | 68 |
| p-Cyanophenol, kg | 1.13 | 1.54 | 1.36 | 1.54 | 1.13 | 1.95 | 1.54 | 1.54 |
| Sodium gluconate, kg | 1.5 | 1.5 | 1.5 | 1.5 | 1.5 | 1.5 | 1.5 | 1.5 |
| Triethylamine, kg | 0.5 | 0.5 | 0.5 | 0.5 | 0.5 | 0.5 | 0.5 | 0.5 |
| Phosgene, kg | 40.8 | 40.8 | 40.8 | 40.8 | 40.8 | 40.8 | 40.8 | 40.8 |
| Tris(hydroxyphenyl)ethane, kg | — | — | — | 0.37 | — | 0.91 | 0.91 | 0.91 |
| Water, $m^3$ | 0.21 | 0.21 | 0.21 | 0.21 | 0.21 | 0.21 | 0.21 | 0.21 |
| Methylene chloride, $m^3$ | 0.49 | 0.49 | 0.49 | 0.49 | 0.49 | 0.49 | 0.49 | 0.49 |
| Resulting Polymer | PC-1 | PC-2 | PC-3 | PC-4 | PC-5 | PC-6 | PC-7 | PC-8 |
| Mw, g/mole | 30,000 | 22,200 | 24,300 | 24,900 | 28,700 | 27,100 | 34,400 | 35,600 |

The physical properties of PC-1 to PC-4 are comparable to p-cumylphenyl endcapped polycarbonates (PC-A and PC-B). A comparison of the properties of PC-1 and PC-A each formulated with 0.3 parts per one hundred parts resin by weight (phr) of PETS and 0.06 phr of tris(2,4-di-tert-butylphenyl) phosphite are shown in Table 2b.

TABLE 2b

| Property | Test Method | Measurement Condition | PC-1 | PC-A |
|---|---|---|---|---|
| Modulus of Elasticity-Avg | ASTM D790 | 23° C. | 2260 | 2345 |
| Stress at Yield-Avg | ASTM D638 | 23° C. | 62.8 | 62 |
| Stress at Break-Avg | ASTM D638 | 23° C. | 73.6 | 69 |
| Elongation at Yield-Avg | ASTM D638 | 23° C. | 6.6 | 7 |
| Elongation at Break-Avg | ASTM D638 | 23° C. | 132.7 | 135 |
| Energy to max Load-Avg | ASTM D3763 | 23° C. | 71.3 | 65 |
| Dynatup Ductility | ASTM D3763 | −40° C. | 100 | 100 |
| NI Ductility | ASTM D256 | 23° C. | 100 | 100 |
| NI Impact Strength-Avg | ASTM D256 | 23° C. | 944 | 944 |
| NI Ductility | ASTM D256 | −10° C. | 0 | 100 |
| NI Impact Strength-Avg | ASTM D256 | −10° C. | 163 | 923 |
| (HDT) Heat Deflection Temp-Avg | ASTM D648 | 0.455 MPa | 144 | 138 |
| Haze, 3.2 mm plaque | ASTM D1003-00 | 23° C. | 0.6 | 0.6 |

The results in Table 2b show that the p-cyanophenyl endcapped polycarbonate (PC-1) has ductility down to −40° C. as measured by the Dynatup method and is transparent, with low haze.

Examples 9 to 12 and Comparative Examples A-B

The properties of thermoplastic compositions comprising PC-1, PC-2, PC-3, or PC-4 obtained above were studied in Examples 9 to 12, in comparison with thermoplastic compositions comprising PC-A or PC-B (p-cumylphenyl endcapped BPA polycarbonates) (Comparative Examples A-B). The thermoplastic compositions were formulated with 0.3 parts per one hundred parts resin by weight (phr) of PETS and 0.06 phr of tris(2,4-di-tert-butylphenyl)phosphite.

In addition, the samples were formulated without FR, 0.08 phr of FR-1, or 0.3 phr of FR-2, as indicated in Table 3. The compositions and the resulting properties are shown in Table 3.

comprising p-cumylphenyl endcapped polycarbonates with similar melt flows containing a flame retardant additive (Comparative PC-A and PC-B).

Also, surprisingly, Ex. 9 shows the inherent flame resistance of p-cyanophenyl endcapped PC-1 without a flame retardant additive (it is UL94 V0 at 3.0 mm and V2 at 2.2 mm). This is an advantage over polycarbonates containing p-cumylphenyl end groups (PC-A and PC-B). It is well known in the art that compositions comprising PC-A and PC-B without a flame retardant additive would be either HB or V2 at 3.0 mm.

Examples 13 to 16 and Comparative Examples C-D

The properties of thermoplastic compositions comprising PC-5, PC-6, PC-7, or PC-8 obtained above were studied in Examples 13-16. In some examples, polycarbonates containing p-cumylphenyl end groups (PC-A and PC-B) were blended with the cyanophenyl endcapped polycarbonates as shown in Table 4. As a comparison, thermoplastic compositions comprising PC-A and PC-B were also studied in Comparative Examples C-D (CE. C-D). The thermoplastic compositions were formulated with 0.3 parts per one hundred

TABLE 3

| | Ex. 9 | | | Ex. 10 | | | Ex. 11 | | | Ex. 12 | | | CE. A | CE. B |
|---|---|---|---|---|---|---|---|---|---|---|---|---|---|---|
| Component | PC-1 | | | PC-2 | | | PC-3 | | | PC-4 | | | PC A | PC B |
| Mw, g/mole | 30,000 | | | 22,200 | | | 24,300 | | | 24,900 | | | 30,000 | 25,900 |
| FR Additive | none | FR-1 | FR-2 | none | FR-1 | FR-2 | none | FR-1 | FR-2 | none | FR-1 | FR-2 | FR-1 | FR-1 |
| UL94 Rating, 3.0 mm | V0 | V0 | NT | V2 | NT | V2 | V2 | V0 | NT | V2 | V0 | V0 | V2 | V0 |
| UL94 Rating, 2.2 mm | V2 | V0 | V2 | V2 | V2 | V2 | V2 | V2 | V2 | V2 | V0 | V0 | V2 | V2 |
| MVR, 300° C./1.2 kg wt | 5.7 | 6.0 | 5.6 | 20.1 | 20.4 | 20 | 14.3 | 14.1 | 13.7 | 9.4 | 9.6 | 9.7 | 6.6 | 12.5 |
| 23° C. NII Impact (% Ductility) | 100 | 100 | 100 | 80 | 100 | 20 | 100 | 100 | 100 | 100 | 100 | 40 | 100 | 100 |

NT: not tested

The results in Table 3 show an improvement in the flame retardant properties of compositions containing the high molecular weight p-cyanophenyl endcapped PC-1 (Ex. 9) or the branched p-cyanophenyl endcapped PC-4 (Ex. 12) containing a flame retardant additive, compared to compositions parts resin by weight (phr) of PETS and 0.06 phr of tris(2,4-di-tert-butylphenyl)phosphite. In addition, the samples were formulated without FR, 0.08 phr of FR-1, or 0.3 phr of FR-2, as indicated in Table 4. The compositions and the resulting properties are shown in Table 4.

TABLE 4

|  | Ex. 13 | Ex. 14 | | Ex. 15 | | Ex. 16 | | | CE. C | | CE. D | |
| --- | --- | --- | --- | --- | --- | --- | --- | --- | --- | --- | --- | --- |
| Component | PC-5 | PC-6 | PC-7 | PC-A | PC-B | PC-8 | PC-A | PC-B | PC-A | PC-B | PC-A | PC-B |
| Wt. % of PC component | 100 | 100 | 100 | 30 | 25 | 45 | 30 | 30 | 30 | 40 | 70 | 30 | 70 | 30 |
| FR Additive | FR-1 | FR-1 | FR-2 | | FR-1 | | FR-1 | | FR-2 | | FR-1 | | FR-2 |
| UL94 Rating 2.5 mm | V0 | V0 | V0 | | V0 | | V0 | | V0 | | drip | | drip |
| UL94 Rating, 2.0 mm | drip | V0 | V0 | | drip | | V0 | | drip | | drip | | drip |
| UL94 Rating, 1.57 mm | drip | V0 | V0 | | drip | | drip | | drip | | drip | | drip |
| MVR, 300° C./ 1.2 kg wt | 7 | 6.5 | 6.5 | | 8 | | 7 | | 7 | | 9 | | 9 |

The data in Table 4 indicates that the cyanophenyl endcapped polycarbonates offer better flame retardant characteristics (UL 94 V0 performance at thinner thickness and no dripping) than p-cumylphenol endcapped polycarbonates with either FR-1 or FR-2.

Rheology of Examples 5, 6, 8 to 12 and Comparative Examples A and B

The rheology of thermoplastic compositions comprising PC-3 (Ex. 11) or PC-B (Comparative Ex. B), each containing 0.3 phr of PETS, 0.06 phr of tris(2,4-di-tert-butylphenyl) phosphite, and 0.08 phr of FR-1, were studied by heating the compositions from 300 to 450° C. at a parallel plate shear rate of 3 rad/second. The results are shown in FIG. 1. Surprisingly, FIG. 1 shows a marked increase in viscosity for the thermoplastic composition comprising PC-3 (p-cyanophenyl endcapped) versus that comprising PC-B (p-cumylphenyl endcapped). Also, the onset of viscosity increase occurs at a lower temperature for the thermoplastic composition comprising PC-3.

Similar results were observed using thermoplastic compositions comprising PC-1, PC-2, or PC-4 (Exs. 5, 6, and 8, respectively, each containing each containing 0.3 phr of PETS, 0.06 phr of tris(2,4-di-tert-butylphenyl)phosphite, 0.08 phr of FR-1) versus the thermoplastic composition comprising PC-A (Comparative Ex. A, containing 0.08 phr of FR-1) (results not shown).

Figure 2:
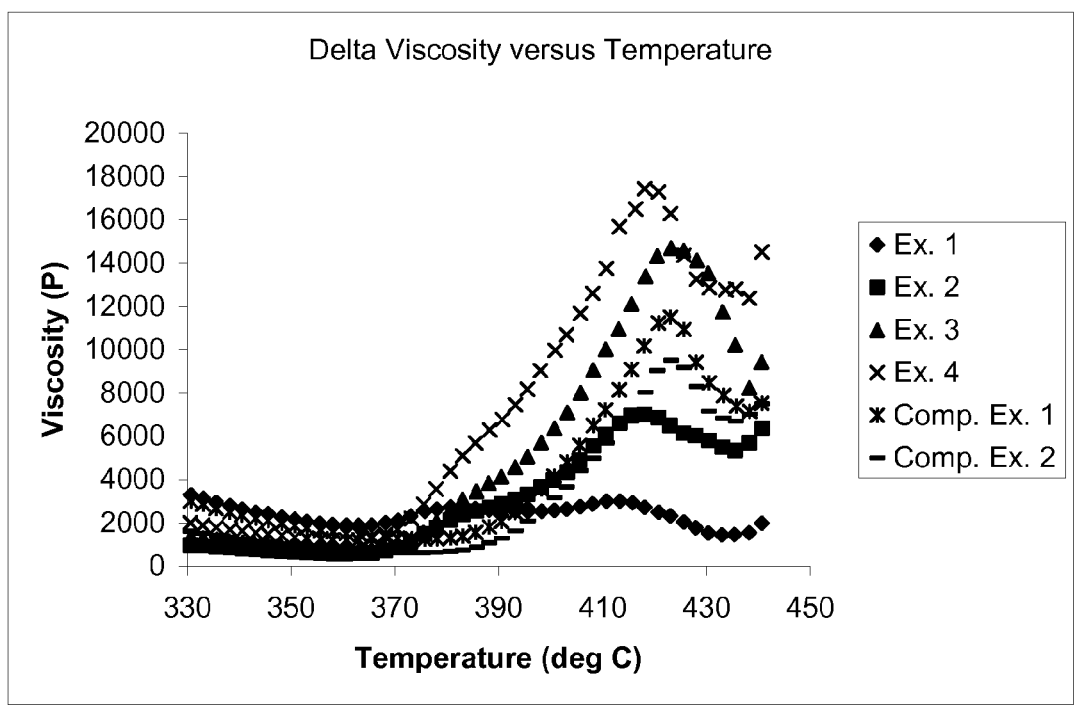
FIG. 2 is a graph showing viscosity versus temperature of p-cyanophenyl endcapped polycarbonates and p-cumylphenyl endcapped polycarbonates.

The rheology of thermoplastic compositions comprising PC-1, PC-2, PC-3, or PC-4 containing 0.08 phr of FR-1 (Ex. 9 to 12, respectively) and Comparative Examples A and B containing 0.08 phr of FR-1 are shown in FIG. 2. Samples were heated from 300 to 450° C. at a parallel plate shear rate of 3 rad/second. FIG. 2 shows that the thermoplastic composition comprising the highest molecular weight p-cyanophenyl polycarbonate (PC-1) does not exhibit a substantial increase in viscosity compared to the rest of the compositions comprising PC-2 to PC-4, PC-A and PC-B. Compositions comprising PC-3 or PC-4 both show the highest viscosity increase.

Additionally, FIG. 2 shows that compositions comprising PC-1 to PC-4 exhibit an initial viscosity increase at 10° C. before those comprising PC-A or PC-B. Compositions comprising PC-A or PC-B both exhibit increases in viscosity, but not to the magnitude of PC-3 and PC-4.

Figure 3:
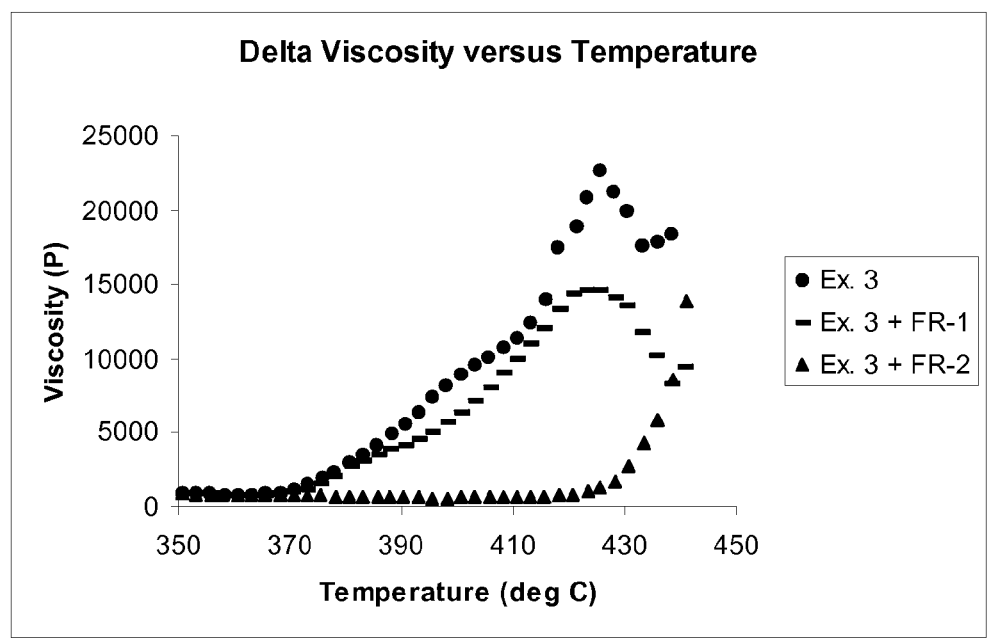
FIG. 3 is a graph showing viscosity versus temperature of p-cyanophenyl endcapped polycarbonates with and without a flame retardant additive.

FIG. 3 shows rheology behaviors of thermoplastic compositions comprising PC-3 containing no FR, 0.08 phr of FR-1, or 0.3 phr of FR-2 (Ex. 11). Samples were heated from 300 to 450° C. at a parallel plate shear rate of 3 rad/second. FIG. 3 shows that a flame retardant agent can influence the rheology behavior of the p-cyanophenyl endcapped polycarbonate. Specifically, the addition of FR-1 to the composition comprising PC-3 lowers the magnitude of the increase in viscosity as compared to the composition without a flame retardant additive. However, the addition of FR-1 does not affect the temperature at which the onset of viscosity increase is observed. On the other hand, the addition of FR-2 delays the onset of viscosity increase by nearly 50° C.

The above results were also found for compositions comprising PC-1, PC-2, or PC-4 (results not shown). However, for PC-1, it was difficult to observe the effect of the flame retardant additive because PC-1 (with and without a flame retardant additive) exhibited a small viscosity increase.

A comparison of the rheology of thermoplastic compositions comprising PC-1 to PC-4 (with or without a flame retardant additive, Exs. 9-12) versus PC-A (with FR-1) and PC-B (with FR-1) is shown in Table 5. Samples were held at various temperatures as shown in Table 5 for thirty minutes at parallel plate shear rate of 10 rad/sec.

TABLE 5

|  | Ex. 9 | | | Ex. 10 | | | Ex. 11 | | | Ex. 12 | | | CE. A | CE. B |
| --- | --- | --- | --- | --- | --- | --- | --- | --- | --- | --- | --- | --- | --- | --- |
| Component | PC-1 | | | PC-2 | | | PC-3 | | | PC-4 | | | PC A | PC B |
| Mw, g/mole | 30,000 | | | 22,200 | | | 24,300 | | | 24,900 | | | 30,000 | 25,900 |
| FR Additive | — | FR-1 | FR-2 | — | FR-1 | FR-2 | — | FR-1 | FR-2 | — | FR-1 | FR-2 | FR-1 | FR-1 |
| Visc. Change at 300° C./30 min | 19 | 18 | 16 | 21 | 38 | 17 | 33 | 25 | 13 | 37 | 42 | 21 | −2 | −5 |
| Visc. Change at 320° C./30 min | 56 | 36 | 33 | 41 | 51 | 49 | 58 | 39 | 42 | 61 | 54 | 75 | −1 | −9 |
| Visc. Change at 340° C./30 min | 135 | 77 | 77 | 79 | 121 | 120 | 129 | 81 | 126 | 80 | 81 | 134 | 0 | −4 |

The results in Table 5 show that all samples comprising PC-1 to PC-4 exhibited substantial viscosity increases with or without a flame retardant additive compared to PC-A (with FR-1) and PC-B (with FR-1). Both PC-A and PC-B had decreases in viscosity for these time intervals and temperatures, most likely due to degradation due to heat instability of the polycarbonate. However, PC-1 to PC-4 all exhibited a gain in viscosity after being held for 30 minutes. Without being bound by theory, it is hypothesized that the gain in viscosity is due to molecular weight gain through branching and/or cross-linking reactions.

Examples 17 to 18

Examples 17 and 18 illustrate the effect of the processing conditions on controlling the molecular weight of a polycarbonate synthesized using the hydrolysis product of p-cyanophenol. The hydrolysis product was formed by contacting p-cyanophenol with warm aqueous sodium hydroxide prior to addition to the phosgenation reactor. In Examples 17 and 18, the following were added into a 3-liter 5 necked Morton flask, equipped with an overhead condenser, an overhead stirrer, a pH probe, a caustic solution inlet, and a phosgene inlet: BPA (50 g, 0.22 mol); p-cyanophenol/4-hydroxybenzoic acid/4-hydroxy-benzamide (hydrolysis product of p-cyanophenyl) (1.32 g, approximately 5 mol % based on BPA); triethylamine (0.46 mL, 0.004 mol); methylene chloride (400 mL); and deionized water (250 mL). The mixture was charged with phosgene (28.9 g, 2 g/min, 0.29 mol). During the addition of phosgene, base (50 wt. % NaOH in deionized water) was simultaneously charged to the reactor to maintain the pH of the reaction between 9 and 11. After the complete addition of phosgene, the reaction was purged with nitrogen gas, and the organic layer was extracted for analysis by GPC. The molecular weight characteristics of Examples 17 and 18 are shown in Table 6.

TABLE 6

|  | Ex. 17 | Ex. 18 |
| --- | --- | --- |
| Resulting Polymer | PC-17 | PC-18 |
| Mw of resulting polymer, g/mole, Actual[a] | 55,925 | 52,016 |
| PDI of resulting polymer[a] | 4.2 | 4.1 |
| Mw of polymer, g/mole, Target[b] | 20,800 | 20,800 |

[b]Calculated based on the degree of polymerization when 5 mol % monofunctional phenol is added compared to total moles of BPA.

The data in Table 6 shows that the desired target molecular weight cannot be achieved when the hydrolysis product of p-cyanophenol is used as a chain stopping agent for polycarbonate. Also, the polydispersity of the polycarbonate product is high compared to the linear polycondensation products of BPA, phosgene, and p-cyanophenol (PDI is less than 3).

Examples 19 to 20

Examples 19 to 20 illustrated the preparation and properties of polycarbonates endcapped using 3,4-dicyanophenol.

In Example 19, the following were added into a 80-liter CSTR equipped with an overhead condenser and a recirculation pump with a flow rate of 40 L/minute: BPA (4540 g, 19.9 mol); methylene chloride (16 L); de-ionized water (14 L); 3,4-dicyano-phenol (93 g, 0.64 mol) pre-dissolved at 2 to 3 wt % in methylene chloride; triethylamine (30 mL); and sodium gluconate (10 g). Phosgene (2962 g, 80 g/min, 29.9 mol) was added to the reactor with simultaneous addition of base (50 wt. % NaOH in deionized water) to maintain the pH of the reaction between 9 and 11. After the complete addition of phosgene, the reaction mixture was purged with nitrogen gas, and the organic layer was extracted. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate (PC-19) was measured to be 30,023 g/mol (referenced to polycarbonate standards) and the PDI was 2.6.

In Example 20, the following were added into an 80-liter CSTR equipped with an overhead condenser and a recirculation pump with a flow rate of 40 L/minute: BPA (4540 g, 19.9 mol); methylene chloride (17 L); de-ionized water (14.8 L), 3,4-dicyano-phenol (120 g, 0.82 mol) pre-dissolved at 2 to 3 wt % in methylene chloride, triethylamine (30 mL), and sodium gluconate (10 g). Phosgene was added to the reactor (2963 g, 80 g/min, 29.9 mol) was added with simultaneous addition of base (50 wt. % NaOH in deionized water) to maintain the pH of the reaction between 9 and 11. After the complete addition of phosgene, the reaction mixture was purged with nitrogen gas, and the organic layer was extracted. The organic extract was washed once with dilute hydrochloric acid (HCl), and subsequently washed with de-ionized water three times. The organic layer was precipitated from methylene chloride into hot steam. The polymer was dried in an oven at 110° C. before analysis. The Mw of the polycarbonate (PC-20) was measured to be 24,552 g/mol (referenced to polycarbonate standards) and the PDI was 2.3.

Thermoplastic compositions comprising PC-19 or PC-20 were formulated with 0.3 phr of PETS, 0.06 phr of 1-168, and 0.08 phr of FR-1. The melt flow, thermal, and flame retardant properties of Examples 19 and 20 with FR-1 are shown in Table 7.

TABLE 7

|  | Ex. 19 | Ex. 20 |
| --- | --- | --- |
| Resulting Polymer | PC-19 | PC-20 |
| Mw of resulting polymer, g/mole | 30,023 | 24,552 |
| PDI of resulting polymer | 2.6 | 2.3 |
| UL94 Rating, 3.0 mm | V0 | V0 |
| UL94 Rating, 2.5 mm | V2 | V0 |
| UL94 Rating, 2.0 mm | V2 | V2 |
| UL94 Rating, 1.5 mm | V2 | V2 |
| MVR, 300° C./1.2 kg wt | 11.1 | 17.8 |
| $T_g$, ° C. | 152 | 152 |

Table 7 shows that the polycarbonates with di-cyanophenyl end groups also exhibit flame retardant properties when formulated with a flame retardant agent.

Example 21 and Comparative Examples E to F

The properties of thermoplastic composition comprising PC-6 obtained above were studied in Example 21, in comparison with thermoplastic compositions comprising PC-A (p-cumylphenyl endcapped BPA polycarbonate described above) or PC-C (p-cumylphenyl endcapped BPA polycarbonate with Mw of 36,500 g/mole) (Comparative Examples E-F).

The thermoplastic compositions were formulated with 0.3 phr of PETS, 0.03 phr of 1-168, 0.08 phr of FR-1, and 0.4 phr of TSAN (anti-drip agent). The resulting properties are shown in Table 8.

TABLE 8

|  | UL94 (3 mm) | UL94 (2.5 mm) | UL94 (2 mm) | UL94 (1.5 mm) | UL94 (1.2 mm) | UL94 (1 mm) | Melt Volume Rate (300 C/1.2 kg wt.) |
|---|---|---|---|---|---|---|---|
| Ex. 21 | V0 | V0 | V0 | V0 | V0 | V0 | 6.58 |
| CE. E | V0 | V0 | V0 | V0 | V2 | fail | 6.54 |
| CE. F | V0 | V0 | V0 | V0 | V0 | V2 | 4.86 |

The data in Table 8 indicates that the cyanophenyl endcapped polycarbonate with FR-1 offers better flame retardant characteristics (UL94 V0 performance at 1 mm thickness) than p-cumylphenol endcapped polycarbonates with FR-1.

Example 22 and Comparative Example G

Examples 22 illustrated the preparation and properties of polycarbonate-polyester-polysiloxane terpolymers endcapped using p-cyanophenol, in comparison with the preparation and properties of polycarbonate-polyester-polysiloxane terpolymers endcapped using p-cumylphenol (Comparative Example G).

In Example 22, oligomer synthesis was carried out by charging the following into a 200-gallon glass lined reactor equipped with condenser, agitator, pH probe, caustic inlet, and recirculation loops: eugenol-capped siloxane (I) (1.42 kg, 1.17 mol), methylene chloride (75 gal), triethylamine (0.73 kg, 7.31 mol), an aqueous solution of resorcinol (194.2 lbs solution, 44.5% w/w, 356.3 mol), and solid 4-cyanophenol (1.7 kg, 15.5 mol). A molten mixture of isophthaloyl chloride and terephthaloyl chloride, 1:1 molar ratio of isophthaloyl chloride and terephthaloyl chloride, 145 lbs, 324.5 mol, 9.5 lb/min) was added to the reaction vessel while simultaneously adding sodium hydroxide (50% w/w sodium hydroxide solution, lbs sodium hydroxide/lbs phthaloyl chloride 0.7 or 1.77 molar sodium hydroxide/phthaloyl chloride ratio) as a separate stream over a 15 min period. The pH decreased from pH 7 to 8 to pH of about 4. After completion of phthaloyl chloride addition, sodium hydroxide was added to raise the pH to 7 to 8.5. The reactor contents were stirred for 10 min.

The entire oligomer solution from the above step was transferred to a 300-gallon glass-lined phosgenation reactor equipped with condenser, agitator, pH probe, phosgene inlet, caustic inlet, and recirculation loop. Six gallons of methylene chloride was used to rinse the oligomer reactor and its condensers. The following were also charged to the phosgenation reactor: bisphenol A (21 lbs, 41.8 mol), water (34 gal) and methylene chloride (31 gal). Phosgene (40 lbs total, 183.4 mol) was co-fed with sodium hydroxide (50% w/w) to the reactor under ratio-pH control. The phosgene addition rate was maintained at 200 lbs/hr for the initial 50% of phosgene addition (20 lbs) and decreased to 150 lbs/hr for the remaining 50% of phosgene addition (20 lbs). The sodium hydroxide/phosgene ratio profile of the batch started with a lb sodium hydroxide/lb phosgene ratio of 2.30 which was changed to 2.20 at 10% of phosgene addition, 2.00 at 50% of phosgene addition, and 2.50 at 70% of phosgene addition. The targeted pH for the phosgenation was 8.2 for the initial 70% of phosgenation and 8.5 for the remaining 30% of phosgenation. The batch was sampled for molecular weight analyses and then re-phosgenated (10 lb phosgene, 45.9 mol, pH target 9.0). The pH was raised to about 9 with 50% w/w sodium hydroxide and the batch was transferred to a centrifuge feed tank, where hydrochloric acid was added to lower the pH of the batch to pH of less than or equal to 8. The resultant solution of polymer in methylene chloride was purified by acid wash and subsequent water washes via centrifugation. The final polymer (PC-22) was isolated by steam precipitation and dried under a stream of hot nitrogen.

In Comparative Example G, oligomer synthesis was carried out by charging the following into a 200-gallon glass lined reactor equipped with condenser, agitator, pH probe, caustic inlet, and recirculation loops: eugenol-capped siloxane (I) (1.38 kg, 1.14 mol), methylene chloride (75 gal), triethylamine (0.74 kg, 7.31 mol), an aqueous solution of resorcinol (202.4 lbs solution, 44.9% w/w, 374.4 mol), and a methylene chloride solution of p-cumylphenol (9.29 kg, 33% w/w, 14.4 mol). A molten mixture of isophthaloyl chloride and terephthaloyl chloride isomers (1:1 molar ratio of isophthaloyl and terephthaloyl isomers, 145.9 lbs, 326 mol, 9.5 lb/min) was added to the reaction vessel while simultaneously adding sodium hydroxide (50% w/w sodium hydroxide solution, lbs sodium hydroxide/lbs phthaloyl chloride 0.7 or 1.77 molar sodium hydroxide/phthaloyl chloride ratio) as a separate stream over a 15 min period. The pH decreased from pH 7 to 8 to a pH of about 4. After completion of phthaloyl chloride addition, sodium hydroxide was added to raise the pH to 7 to 8.5. The reactor contents were stirred for 10 minutes and sampled for oligomer molecular weight analyses.

The entire oligomer solution from the above step was transferred to a 300-gallon glass-lined phosgenation reactor equipped with condenser, agitator, pH probe, phosgene inlet, caustic inlet, and recirculation loop. Six gallons of methylene chloride was used to rinse the oligomer reactor and its condensers. The following were also charged to the phosgenation reactor: bisphenol A (14.2 lbs, 28.2 mol), sodium gluconate (0.36 lb), water (35.3 gal) and methylene chloride (41 gal). Phosgene (40 lbs total, 183.4 mol) was co-fed with sodium hydroxide (50% w/w) to the reactor under ratio-pH control. The phosgene addition rate was maintained at 200 lbs/hr for the initial 80% of phosgene addition (32 lbs) and decreased to 150 lbs/hr for the remaining 20% of phosgene addition (8 lbs). The sodium hydroxide/phosgene ratio profile of the batch started with a lb sodium hydroxide/lb phosgene ratio of 2.30 which was changed to 2.20 at 10% of phosgene addition, 2.00 at 50% of phosgene addition, and 2.50 at 70% of phosgene addition. The targeted pH for the phosgenation was 8.2 for the initial 70% of phosgenation and 8.5 for the remaining 30% of phosgenation. The batch was sampled for molecular weight analyses and then re-phosgenated (10 lb phosgene, 45.9 mol, pH target 9.0). The pH was raised to about 9 with 50% w/w sodium hydroxide and the batch was transferred to a centrifuge feed tank, where hydrochloric acid was added to lower the pH of the batch to pH less than or equal to about 8. The resultant solution of polymer in methylene chloride was purified by acid wash and subsequent water washes via centrifugation. The final polymer was isolated by steam precipitation and dried under a stream of hot nitrogen The heat release testing was done on 15.2×15.2 cm plaques 2.0 mm thick using the Ohio State University (OSU) rate-of-heat release apparatus, as measured by the method listed in FAR 25.853 (d), and in Appendix F, section IV (FAR F25.4).

Total heat release was measured at the two minute mark in kW-min/m² (kilowatt minutes per square meter). Peak heat release was measured as kW/m² (kilowatts per square meter). The heat release test method is also described in the "Aircraft Materials Fire Test Handbook" DOT/FAA/AR-00/12, Chapter 5 "Heat Release Test for Cabin Materials".

In the FAA Vertical Burn test (FAR/JAR 25.853 Amendment 25-83. Part I, (a.)), a sample clamped vertically is burned with a flame for 12 or 60 seconds (as used herein, 60 sec.), depending on the application. The length of sample burned (in inches) and the time for flame to extinguish are recorded. In addition, the burn time of the longest burning particle is also recorded.

The thermoplastic compositions were formulated with 0.06 phr of FR-1, and 0.06 phr of a heat stabilizer. The resulting properties are shown in Table 9.

TABLE 9

| | Sample Burning Time (seconds)$^a$ | Samples with burning time > 15 seconds$^b$ | Time of burning particle (seconds)$^c$ | Number of burning particle failures$^d$ | OSU at 2 min (kW-min/m²) | OSU at peak (kW-min/m²) |
|---|---|---|---|---|---|---|
| Ex. 22 | 1.4 | 0 | 0 | 0 | 17 | 35 |
| CEx. G | 7.1 | 2 | 1.8 | 3 | 10 | 46 |

$^a$Average of 14 samples.
$^b$Failure is recorded if burning time is greater than 15 seconds (14 samples tested).
$^c$Average of 14 samples.
$^d$Failure is recorded if sample burns greater than 3 seconds (14 samples tested).

The data in Table 9 indicates that the cyanophenyl end-capped polycarbonate-polyester-polysiloxane terpolymer with FR-1 (Ex. 22) passes the FAA regulation and OSU heat release test and has more robust flame retardant performance than the p-cumylphenol endcapped polycarbonate-polyester-polysiloxane terpolymer with FR-1 (CEx. G).

Examples 23 to 36

The materials listed in Table 10 were used in the following additional examples. These examples illustrate the preparation of BPA polycarbonates with branching agents (PC-23 to PC-36). Amounts and product characteristics are shown in Tables 11.

TABLE 10

| Acronym | Chemical name | Supplier |
|---|---|---|
| PC-H | BPA polycarbonate (Mw = 26,500 g/mol) | GE Plastics |
| PC-I | BPA polycarbonate (Mw = 21,800 g/mol) | GE Plastics |
| PETS | Pentaerythritol tetrastearate (plasticizer/mold release agent) | FACI Farasco-Genova Italy |
| I-168 | Tris (2,4-di-tert-butylphenyl)phosphite (Antioxidant) | Ciba Specialty Chemicals |
| FR-1 (Rimar salt) | Potassium perfluorobutane sulfonate | 3M |
| FR-3 | Octaphenylcyclotetrasiloxane | Momentive Performance Materials |

All thermoplastic compositions except where indicated were compounded on a Werner & Pfleiderer co-rotating twin screw extruder (Length/Diameter (L/D) ratio=30/1, vacuum port located near die face), with enough distributive and dispersive mixing elements to produce good mixing between the components of the polymer compositions. The compositions were subsequently molded according to ISO 294 on a Husky or BOY injection-molding machine. Compositions were compounded and molded at a temperature of 270 to 330° C., although it will be recognized by one skilled in the art that the method is not be limited to these temperatures.

In Examples 23 to 33, the following were added into a 70-liter CSTR equipped with an overhead condenser and a recirculation pump with a flow rate of 40 L/minute: BPA (4540 g, 19.9 mol); 4-hydroxybenzonitrile (amounts shown in Table 10); triethylamine (30 mL, 0.22 mol); methylene chloride (16 L); de-ionized water (14 L); sodium gluconate (10 g); and tris-(hydroxyphenyl)ethane (THPE, amounts shown in Table 10). Phosgene (800 g, 80 g/min, 8.1 mol) was added to the reactor with simultaneous addition of base (50 wt. % NaOH in deionized water) to maintain the pH of the reaction between 12 and 13. After the first 800 g addition of phosgene, the pH was lowered to between 9 and 10 by the simultaneous charge of phosgene (1374 g, 80 g/min, 13.9 mol) and base (50 wt. % NaOH in deionized water). The organic extract was washed with dilute hydrochloric acid (HCl), and subsequently washed with de-ionized water by centrifugation. The organic layer was precipitated from methylene chloride into hot steam. The polymer was dried in an oven at 110° C. before analysis. The Mw of the polycarbonate (PC-23 to PC-33) was measured (referenced to polycarbonate standards) as well as the polydispersity index (PDI), and both are shown in Table 11.

In Example 34, the following were added into a 70-liter CSTR equipped with an overhead condenser and a recirculation pump with a flow rate of 40 L/minute: BPA (4540 g, 19.9 mol); 4-hydroxybenzonitrile (100 g, 0.83 mol); triethylamine (30 mL, 0.22 mol); methylene chloride (16 L); de-ionized water (14 L); sodium gluconate (10 g); and tris-(hydroxyphenyl)ethane (THPE, amounts shown in Table 10). Phosgene (800 g, 80 g/min, 8.1 mol) was added to the reactor with simultaneous addition of base (50 wt. % NaOH in deionized water) to maintain the pH of the reaction between 12 and 13. After the first 800 g addition of phosgene, a second charge of solution of 4-hydroxybenzonitrile (84 g, 0.7 mol, dissolved into 2 L of methylene chloride), and the pH was lowered to between 9 and 10 by the simultaneous charge of phosgene (1374 g, 80 g/min, 13.9 mol) and base (50 wt. % NaOH in deionized water). The organic extract was washed with dilute hydrochloric acid (HCl), and subsequently washed with de-ionized water by centrifugation. The organic layer was precipitated from methylene chloride into hot steam. The polymer was dried in an oven at 110° C. before analysis. The Mw of the polycarbonate (PC-34) was measured (referenced to polycarbonate standards) as well as the polydispersity index (PDI), and both are shown in Table 11.

In Examples 35 and 36, the following were added into a 70-liter CSTR equipped with an overhead condenser and a recirculation pump with a flow rate of 40 L/minute: BPA (4540 g, 19.9 mol); 4-hydroxybenzonitrile (amounts shown in Table 10); triethylamine (30 mL, 0.22 mol); methylene chloride (16 L); de-ionized water (14 L); and sodium gluconate (10 g). Phosgene (875 g, 80 g/min, 8.84 mol) was added to the reactor with simultaneous addition of base (50 wt. % NaOH in deionized water) to maintain the pH of the reaction between 9 and 11. After the first 875 g addition of phosgene, a solution of trimellitic trichloride (TMTC, 158.6 g, 0.6 mol dissolved in 1 L of methylene chloride for Example 35, 79.4 g, 0.3 mol dissolved in 1 L of methylene chloride for Example 36) was added to the reactor, and the pH was maintained at between 9 and 11 by the simultaneous charge of phosgene (1699 g, 17.2 mol) and base (50 wt. % NaOH in deionized water). The organic extract was washed with dilute hydrochloric acid (HCl), and subsequently washed with de-ionized water by centrifugation. The organic layer was precipitated from methylene chloride into hot steam. The polymer was dried in an oven at 110° C. before analysis. The Mw of the polycarbonate (PC-35 and PC-36) was measured (referenced to polycarbonate standards) as well as the polydispersity index (PDI), and both are shown in Table 11.

Examples 37 to 57 and Comparative Example H

The properties of thermoplastic compositions comprising the polycarbonates PC-23 to PC-36 obtained above were studied in Examples 37 to 57, in comparison with thermoplastic compositions comprising PC-H (Comparative Example 1 PC) (Comparative Example H). The polycarbonates PC-23 to PC-36 were used alone or were blended with a BPA polycarbonate (PC-1) in the proportions shown in Table 12. The thermoplastic compositions were formulated with 0.3 parts per one hundred parts resin by weight (phr) of PETS and 0.06 phr of tris(2,4-di-tert-butylphenyl)phosphite.

In addition, the samples were formulated with FR-1, FR-3, or a combination of FR-1 and FR-3 as indicated in Table 12. The compositions and the resulting properties are shown in Table 12.

Some of the compositions were tested for haze and transparency, according to ASTM D1003-00, and shear thinning (melt viscosity) and compared to the composition comprising PC-H (Comparative Example H). Results are shown in Tables 13 and 14.

TABLE 11

| Component | Ex. 23 | Ex. 24 | Ex. 25 | Ex. 26 | Ex. 27 | Ex. 28 | Ex. 29 |
|---|---|---|---|---|---|---|---|
| 4-hydroxybenzonitrile, g | 155.3 | 155.3 | 131.4 | 184.0 | 184.0 | 184.0 | 227.0 |
| Tris(hydroxyphenyl)ethane, g (THPE) | 91.4 | 91.4 | 91.4 | 109.7 | 110.2 | 109.7 | 182.8 |
| Trimellitic trichloride (g) (TMTC) | — | — | — | — | — | — | — |
| Resulting Polymer | PC-23 | PC-24 | PC-25 | PC-26 | PC-27 | PC-28 | PC-29 |
| Mw, g/mole | 25,334 | 28,002 | 35,974 | 28,874 | 31,989 | 27,917 | 27,379 |
| Polydispersity Index (PDI) | 3.5 | 3.7 | 4.3 | 4.3 | 4.1 | 4.1 | 3.8 |

| Component | Ex. 30 | Ex. 31 | Ex. 32 | Ex. 33 | Ex. 34 | Ex. 35 | Ex. 36 |
|---|---|---|---|---|---|---|---|
| 4-hydroxybenzonitrile, g | 203.1 | 203.1 | 227.0 | 189.8 | 100.0 | 227.0 | 154.2 |
| Tris(hydroxyphenyl)ethane, g (THPE) | 137.1 | 137.1 | 137.1 | 91.4 | 109.7 | — | — |
| Trimellitic trichloride (g) (TMTC) | — | — | — | — | — | 158.6 | 79.3 |
| Resulting Polymer | PC-30 | PC-31 | PC-32 | PC-33 | PC-34 | PC-35 | PC-36 |
| Mw, g/mole | 24,960 | 25,046 | 21,017 | 21,839 | 27,641 | 25,815 | 28,555 |
| Polydispersity Index (PDI) | 3.5 | 3.4 | 2.9 | 3.1 | 3.9 | 3.6 | 3.2 |

TABLE 12

| Component | Ex. 37 | Ex. 38 | Ex. 39 | Ex. 40 | Ex. 41 | Ex. 42 | Ex. 43 | Ex. 44 | Ex. 45 | Ex. 46 | Ex. 47 | Ex. 48 | Ex. 49 | Ex. 50 |
|---|---|---|---|---|---|---|---|---|---|---|---|---|---|---|
| Resin 1 | PC-23 | PC-24 | PC-24 | PC-25 | PC-25 | PC-26 | PC-26 | PC-27 | PC-28 | PC-34 | PC-29 | PC-30 | PC-31 | PC-32 |
| % Resin 1 | 100 | 80 | 80 | 50 | 50 | 70 | 70 | 80 | 90 | 100 | 100 | 100 | 100 | 100 |
| Resin 2 | — | PC-I | PC-I | PC-I | PC-I | PC-I | PC-I | PC-I | PC-I | — | — | — | — | — |
| % Resin 2 | 0 | 20 | 20 | 50 | 50 | 30 | 30 | 20 | 10 | 0 | 0 | 0 | 0 | 0 |
| MVR (300° C., 1.2 kg) | 13.9 | 12.1 | 11.1 | 10.4 | 9.8 | 21.4 | 21.0 | 6.3 | 18.7 | 15.8 | 6.4 | 6.2 | 14.0 | 28.3 |
| FR-3 (pph) | 0.09 | 0.09 | 0.09 | 0.09 | 0.09 | 0.09 | 0.09 | 0.09 | 0.09 | 0.09 | 0.09 | 0.09 | 0.09 | 0.09 |
| FR-4 (pph) | 0.05 | 0 | 0.05 | 0 | 0.05 | 0 | 0.05 | 0.05 | 0.05 | 0.05 | 0.05 | 0.05 | 0.05 | 0.05 |
| UL94 at 1.5 mm | V0 | V0 | V0 | V0 | V0 | V0 | V2 | V0 | V0 | V0 | V0 | V0 | V0 | V2 |
| % drip | 0 | 0 | 0 | 0 | 0 | 0 | 80 | 0 | 0 | 0 | 0 | 0 | 0 | 60 |
| UL94 at 1.0 mm | V0 | V2 | V2 | V2 | V2 | V2 | V2 | V0 | V0 | V0 | V0 | V0 | V0 | V2 |
| % drip | 0 | 80 | 80 | 100 | 100 | 80 | 80 | 0 | 0 | 0 | 0 | 0 | 0 | 80 |

TABLE 12-continued

| Component | Ex. 51 | Ex. 52 | Ex. 53 | Ex. 54 | Ex. 55 | Ex. 56 | Ex. 57 | CE. H |
|---|---|---|---|---|---|---|---|---|
| Resin 1 | PC-33 | PC-35 | PC-35 | PC-35 | PC-36 | PC-36 | PC-36 | PC-H |
| % Resin 1 | 100 | 100 | 50 | 75 | 100 | 50 | 75 | 100 |
| Resin 2 | — | — | PC-I | PC-I | — | PC-I | PC-I | — |
| % Resin 2 | 0 | 0 | 50 | 25 | 0 | 50 | 25 | 0 |
| MVR (300° C., 1.2 kg) | 24.3 | 27.1 | 27.6 | 26.7 | 8.9 | 18.1 | 13.8 | 11.2 |
| FR-3 (pph) | 0.09 | 0.09 | 0.09 | 0.09 | 0.09 | 0.09 | 0.09 | 0.10 |
| FR-4 (pph) | 0.05 | 0.05 | 0.05 | 0.05 | 0.05 | 0.05 | 0.05 | 0.08 |
| UL94 at 1.5 mm | V2 | V0 | V0 | V0 | V0 | V0 | V0 | V2 |
| % drip | 40 | 0 | 0 | 0 | 0 | 0 | 0 | 100 |
| UL94 at 1.0 mm | V2 | V0 | V2 | V0 | V2 | V2 | V2 | V2 |
| % drip | 80 | 0 | 100 | 0 | 80 | 80 | 80 | 100 |

TABLE 13

| Composition | Haze @ 3.2 mm | % T @ 3.2 mm |
|---|---|---|
| Example 44 | 1.1 | 88.0 |
| Example 45 | 1.0 | 88.2 |
| Example 46 | 1.0 | 88.2 |

TABLE 14

| Composition | Melt Viscosity @ 25 s$^{-1}$ (Pa-s) | Melt Viscosity @ 1500 s$^{-1}$ (Pa-s) |
|---|---|---|
| Example 50 | 452 | 153 |
| Comp. Ex. H | 469 | 253 |

The data in Table 12 shows that all of compositions of Examples 37 to 57, made from PC-23 to PC-36, have better UL94 performance at both 1.5 mm and 1.0 mm than the composition of Comparative Example H, made from PC-H (a BPA polycarbonate). The inclusion of a branching agent, such as TMTC or THPE, a chain terminator (4-hydroxybenxonitrile), and a flame retardant or combination of flame retardants, provides compositions having excellent flame retardant properties. Additionally, all of the compositions are essentially free of bromine and chlorine. The compositions of Examples 37 to 57 all had a haze level of less than 3% when measured at 1 mm thickness according to ASTM D1003-00. The compositions had a haze level of less than 6% when measured at 3.2 mm thickness according to ASTM-D1003-00. Additionally, the polycarbonates PC-23 to PC-36 are also miscible with BPA polycarbonate, as shown by a few examples in Table 13. Finally, all of the compositions display better shear-thinning behavior than non-branched (linear) BPA polycarbonate, as shown by the results in Table 14.

Additional samples were produced using the polycarbonate of the invention, as well as various impact modifiers and a flame retardant using the materials listed in Table 15. The samples were tested for physical properties as well as flame retardance. The compositions (examples A1 to A11) are shown in Table 16, and the properties are shown in Tables 17 to 21.

TABLE 15

| Acronym | Chemical name | Supplier |
|---|---|---|
| PC-1 | BPA polycarbonate (Mw approx. 22,000 g/mol) | GE Plastics |
| PC-2 | BPA polycarbonate (Mw approx. 29,000 g/mol) | GE Plastics |
| PC-3 | BPA polycarbonate (Mw approx. 30,000 to 35,000 g/mol) | GE Plastics |
| PC-4 | BPA polycarbonate (Mw approx. 20,000 to 25,000 g/mol) | GE Plastics |
| BABS | Bulk Acrylonitrile Butadiene Styrene with nominal 16% butadiene and content and nominal 15% acrylonitrile content, phase inverted with occluded SAN in a butadiene phase in SAN matrix | GE Plastics |
| SAN-1 | Styrene-Acrylonitrile Copolymer with nominal 23 to 25% acrylonitrile content, with a molecular weight of about 65,000 (Calibrated on Polystyrene standards based GPC weight average molecular weight) | GE Plastics |
| SAN-2 | Styrene-Acrylonitrile Copolymer with nominal 26 to 28% acrylonitrile content, with a molecular weight of about 170,000 (Calibrated on Polystyrene standards based GPC weight average molecular weight) | GE Plastics |
| FR | Bisphenol A bis(diphenylphosphate) (BPADP) | Nagase Co. Ltd |
| AO-1 | Tris (2,4-di-tert-butylphenyl)phosphite (Antioxidant - Irgaphos ™ I-168) | Great Lakes Chemical Corp. |
| AO-2 | Hindered phenol antioxidant (Irganox ™ 1076) | Ciba Specialty Chemicals Ltd |

TABLE 15-continued

| Acronym | Chemical name | Supplier |
|---|---|---|
| PETS | Pentaerythritol tetrastearate | Faci Asia Pacific PTE LTD |
| PC-Si | Polycarbonate-Polysiloxane copolymer with 20% eugenol endcapped siloxane D-50, nominal 30,000 MW on absolute PC scale | GE Plastics |
| MBS | MBS is nominal 75-82 wt. % butadiene core with a balance styrene-methyl methacrylate shell. (Trade name EXL-2691A) | Rohm & Haas |
| TSAN | PTFE encapsulated in SAN (50 wt. % PTFE, 50 wt. % SAN) | GE Plastics |
| Nitrile PC-1 | BPA polycarbonate having about 4% nitrile end capping and a MW of about 29,400 (on an absolute PC molecular weight scale), and as described in Example 1 | GE Plastics |
| Nitrile PC-2 | BPA polycarbonate having about 4% nitrile end capping and a MW of about 22,500 (measured by on an absolute PC molecular weight scale), and as described in Example 2 | GE Plastics |

All thermoplastic compositions were melt extruded on a twin screw extruder (Length/Diameter (L/D) ratio=40.5). The compositions were subsequently molded on a Nissei or Netstal injection-molding machine. Compositions were compounded and molded at a temperature of 230 to 270° C., although it will be recognized by one skilled in the art that the method is not be limited to these temperatures.

Heat Deflection Temperature (HDT) is a relative measure of a material's ability to perform for a short time at elevated temperatures while supporting a load. The test measures the effect of temperature on stiffness: a standard test specimen is given a defined surface stress and the temperature is raised at a uniform rate. Heat Deflection Test (HDT) was determined per ASTM D648, using a flat, 3.2 mm thick bar, molded Tensile bar subjected to 0.45 MPa or a flat, 6.4 mm thick bar, molded Tensile bar subjected to 1.82 MPa, as indicated in the Tables.

Instrumental Impact (or Multi-Axial Impact (MAI) or Dynatup Plaque Impact Energy) was measured according to D3763 using a plaque 3.2 mm thick, 10 centimeters diameter, with a dart diameter of 12.5 mm at 3.5 m/s. The results represent the total energy absorbed and are reported in Joules. This procedure provides information on how a material behaves under multi-axial deformation conditions. The deformation applied is a high speed puncture. The final test result is calculated as the average of the test results of ten test plaques.

Percent ductility was determined on 3.2 mm (one-eighth inch) plaques (as molded for Instrumental Impact test according to D3763) at room temperature using the impact energy as well as stress whitening of the fracture surface. Generally, significant stress whitening of the fractured surface accompanied by gross deformation at the fractured tip can indicate ductile failure mode; conversely, lack of significant stress whitening of the fractured surface accompanied by gross deformation at the fractured tip can indicate brittle failure mode. Ten bars were tested, and percent ductility is expressed as a percentage of impact bars that exhibited ductile failure mode. Ductility tends to decrease with temperature, and the ductile transition temperature is the temperature at which % ductility equals 50%.

Tensile properties such as Tensile Modulus (of Elasticity), Tensile Stress at Yield and Break, and Tensile Elongation at Yield and Break were determined using Type 13.2 mm thick molded tensile bars and tested per ASTM D638 at a pull rate of 1 mm/min. until 1% strain, followed by a rate of 50 mm/min. until the sample broke. It is also possible to measure at 5 mm/min. if desired for the specific application, but the samples measured in these experiments were measured at 50 mm/min. Tensile Modulus and Tensile Stress at Yield and Break results are reported as MPa, and Tensile Elongation at Yield and Break are reported as a percentage.

Flexural modulus and flex stress (at 5%) was determined using a 3.2 mm-thick molded test bar at 1.27 mm/min, pursuant to ASTM D790.

Spiral Flow Length testing was performed according to the following procedure. A molding machine with a barrel capacity of 3 to 5 ounces (85 to 140 g) and channel depths of 0.03, 0.06, 0.09, or 0.12 inches (0.76, 1.52, 2.29, or 3.05 millimeters, respectively) is loaded with pelletized thermoplastic composition. The mold and barrel are heated to a temperature suitable to flow the polymer, typically 240 to 280° C. The thermoplastic composition, after melting and temperature equilibration, is injected into the selected channel of the mold at 1500 psi (10.34 MPa) for a minimum flow time of 6 seconds, at a rate of 6.0 inches (15.24 cm) per second, to allow for maximum flow prior to gate freeze. Successive samples are generated using a total molding cycle time of 35 seconds. Samples are retained for measurement either after 10 runs have been completed, or when successively prepared samples are of consistent size. Five samples are then collected and measured to within the nearest 0.25 inches (0.64 cm), and a median length for the five samples is reported. As reported herein, spiral flow was determined at 260° C., 1500 psi fill pressure, 6-second injection, with 0.09 in. wall thickness.

Izod Impact Strength was measured according to ISO 180 ('NII') or ASTM D256 as indicated in the Tables. ISO 180 ('NII') is used to compare the impact resistances of plastic materials. ISO Izod Impact was determined using a 4 mm thick test sample cut from the tensile bars described above. It was determined per ISO 180/1A. The ISO designation reflects type of specimen and type of notch: ISO 180/1A means specimen type 1 and notch type A. The ISO results are defined as the impact energy in joules used to break the test specimen, divided by the specimen area at the notch. Results are reported in $kJ/m^2$. ASTM D256 was also used, and the ASTM Izod Impact was determined using a molded Izod impact bar 3.2 mm thick, 12.5 mm wide, 3 inches long. The samples were impacted with an impact energy of 5.5 J.

Percent ductility was determined on one-eighth inch (3.2 mm) bars or plaques (for Izod and Dynatup respectively) at room temperature using the impact energy as well as stress whitening of the fracture surface. Generally, significant stress whitening of the fractured surface accompanied by gross deformation at the fractured tip can indicate ductile failure mode; conversely, lack of significant stress whitening of the fractured surface accompanied by gross deformation at the fractured tip can indicate brittle failure mode. Ten bars were tested, and percent ductility is expressed as a percentage of impact bars that exhibited ductile failure mode. Ductility tends to decrease with temperature, and the ductile transition temperature is the temperature at which % ductility equals 50%.

Melt Volume Rate (MVR) was determined at 260° C. using a 2.16-kilogram weight, with a six minute preheat, in accordance with ASTM D1238.

Charpy Notched Impact ISO 179/1 eA is used to compare the impact resistances of plastic materials. Charpy Notched Impact was determined using a 4 mm thick sample cut from the tensile bar previously described. The ISO results are defined as the impact energy in joules used to break the test specimen, divided by the specimen area at the notch. Results are reported in $kJ/m^2$. The samples were impacted with an impact energy of 15 J. Charpy D/B refers to the ductile transition temperature, which is the temperature at which % ductility equals 50%.

Flammability tests were performed following the procedure of Underwriter's Laboratory Bulletin 94 entitled "Tests for Flammability of Plastic Materials, UL94." According to this procedure, materials may be classified as HB, V0, UL94 V1, V2, 5VA and/or 5VB on the basis of the test results obtained for five samples. The criteria for each of these flammability classifications are described below.

V0: In a sample placed so that its long axis is 180 degrees to the flame, the average period of flaming and/or smoldering after removing the igniting flame does not exceed five seconds and none of the vertically placed samples produces drips of burning particles that ignite absorbent cotton. Five bar flame out time (FOT) is the sum of the flame out time for five bars, each lit twice for a maximum flame out time of 50 seconds. FOT1 is the average flame out time after the first light. FOT2 is the average flame out time after the second light.

V1: In a sample placed so that its long axis is 180 degrees to the flame, the average period of flaming and/or smoldering after removing the igniting flame does not exceed twenty-five seconds and none of the vertically placed samples produces drips of burning particles that ignite absorbent cotton. Five bar flame out time is the sum of the flame out time for five bars, each lit twice for a maximum flame out time of 250 seconds.

5VB: a flame is applied to a vertically fastened, 5-inch (127 mm) by 0.5-inch (12.7 mm) test bar of a given thickness above a dry, absorbent cotton pad located 12 inches (305 mm) below the bar. The thickness of the test bar is determined using calipers with 0.1 mm accuracy. The flame is a 5-inch (127 mm) flame with an inner blue cone of 1.58 inches (40 mm). The flame is applied to the test bar for 5 seconds so that the tip of the blue cone touches the lower corner of the specimen. The flame is then removed for 5 seconds. Application and removal of the flame is repeated for until the specimen has had five applications of the same flame. After the fifth application of the flame is removed, a timer (T-0) is started and the time that the specimen continues to flame (after-flame time), as well as any time the specimen continues to glow after the after-flame goes out (after-glow time), is measured by stopping T-0 when the after-flame stops, unless there is an after-glow and then T-0 is stopped when the after-glow stops. The combined after-flame and after-glow time must be less than or equal to 60 seconds after five applications of a flame to a test bar, and there may be no drips that ignite the cotton pad. The test is repeated on 5 identical bar specimens. If there is a single specimen of the five that does not comply with the time and/or no-drip requirements then a second set of 5 specimens are tested in the same fashion. All of the specimens in the second set of 5 specimens must comply with the requirements in order for material in the given thickness to achieve the 5VB standard.

The data was also analyzed by calculating the average flame out time, standard deviation of the flame out time and the total number of drips, and by using statistical methods to convert that data to a prediction of the probability of first time pass, or "p(FTP)", that a particular sample formulation would achieve a "pass" rating in the conventional UL94 V0 or V1 testing of 5 bars. The probability of a first time pass on a first submission (pFTP) may be determined according to the formula:

$$pFTP=(P_{t1>mbt,n=0} \times P_{t2>mbt,n=0} \times P_{total<=mbt} \times P_{drip,n=0})$$

where $P_{t1>mbt,\ n=0}$ is the probability that no first burn time exceeds a maximum burn time value, $P_{t2>mbt,\ n=0}$ is the probability that no second burn time exceeds a maximum burn time value, $P_{total<=mbt}$ is the probability that the sum of the burn times is less than or equal to a maximum total burn time value, and $P_{drip,\ n=0}$ is the probability that no specimen exhibits dripping during the flame test. First and second burn time refer to burn times after a first and second application of the flame, respectively.

The probability that no first burn time exceeds a maximum burn time value, $P_{t1>mbt,\ n=0}$, may be determined from the formula:

$$P_{t1>mbt,n=0}=(1-P_{t1>mbt})^5$$

where $P_{t1>mbt}$ is the area under the log normal distribution curve for t1>mbt, and where the exponent "5" relates to the number of bars tested.

The probability that no second burn time exceeds a maximum burn time value may be determined from the formula:

$$P_{t2>mbt,n=0}=(1-P_{t2>mbt})$$

where $P_{t2>mbt}$ is the area under the normal distribution curve for t2>mbt. As above, the mean and standard deviation of the burn time data set are used to calculate the normal distribution curve. For the UL94 V0 rating, the maximum burn time is 10 seconds. For a V-1 or V-2 rating the maximum burn time is 30 seconds[5]

The probability $P_{drip,\ n=0}$ that no specimen exhibits dripping during the flame test is an attribute function, estimated by:

$$(1-P_{drip})^5$$

where $P_{drip}$=(the number of bars that drip/the number of bars tested).

The probability $P_{total<=mbt}$ that the sum of the burn times is less than or equal to a maximum total burn time value may be determined from a normal distribution curve of simulated 5-bar total burn times. The distribution may be generated from a Monte Carlo simulation of 1000 sets of five bars using the distribution for the burn time data determined above. Techniques for Monte Carlo simulation are well known in the art. A normal distribution curve for 5-bar total burn times may be generated using the mean and standard deviation of the simulated 1000 sets. Therefore, $P_{total<=mtbt}$ may be determined from the area under a log normal distribution curve of a set of 1000 Monte Carlo simulated 5-bar total burn time for total<=maximum total burn time. For the UL-94 V-0 rating, the maximum total burn time is 50 seconds. For a V1 or V2 rating, the maximum total burn time is 250 seconds.

Preferably, p(FTP) is as close to 1 as possible, for example, greater than or equal to about 0.85, optionally greater than or equal to about 0.9 or, more specifically, greater than or equal to about 0.95, for maximum flame-retardant performance in UL testing. The p(FTP)≧0.85 is a more stringent standard than merely specifying compliance with the referenced V0 or V1 test.

TABLE 18

| | | A1 | A2 | A3 |
|---|---|---|---|---|
| V0/1.2 mm, 23° C., 48 hr | pftp | 0.00 | 1.00 | 0.98 |
| | fot2, s | 4.8 | 2.7 | 2.8 |
| | UL Comments | 5/10 drip | no drip | no drip |
| V0/1.2 mm, 70° C., 168 hr | pftp | 1.00 | 0.98 | 0.96 |
| | fot2, s | 1.9 | 3.4 | 2.9 |
| | UL Comments | no drip | no drip | no drip |
| 5VB/1.8 mm, 23° C., 48 hr | fot, s | 3.3 | 5.3 | 4.9 |
| | UL Comments | 3/5 drip | no drip | no drip |
| 5VB/1.8 mm, 70° C., 168 hr | fot, s | 1.6 | 5.0 | 2.7 |
| | UL Comments | 3/5 drip | 3/5 drip | no drip |

TABLE 16

| Description/Sample | Unit | A1 | A2 | A3 | A4 | A5 | A6 | A7 | A8 | A9 | A10 | A11 |
|---|---|---|---|---|---|---|---|---|---|---|---|---|
| PC-1 | % | 37.8 | 0 | 0 | 35.4 | 0 | 0 | 63.82 | 0 | 31.92 | 0 | 0 |
| PC-2 | % | 23.2 | 0 | 21 | 35.3 | 0 | 33.35 | 5.72 | 0 | 4.12 | 6 | 0 |
| PC-3 | % | 0 | 0 | 0 | 0 | 0 | 0 | 0 | 0 | 0 | 10 | 16 |
| PC-4 | % | 0 | 0 | 0 | 0 | 0 | 0 | 0 | 0 | 0 | 58.94 | 21.47 |
| BABS | % | 12.5 | 12.5 | 12.5 | 17.0 | 17.0 | 17.0 | 5 | 5 | 5 | 0 | 0 |
| SAN-1 | % | 7.0 | 7.0 | 7.0 | 0.0 | 0.0 | 0.0 | 0 | 0.0 | 0 | | |
| SAN-2 | % | 0.0 | 0.0 | 0.0 | 0.0 | 0.0 | 0.0 | 0 | 0 | 0 | 6.45 | 6.45 |
| FR | % | 16.0 | 16.0 | 16.0 | 11.0 | 11.0 | 11.0 | 10 | 10 | 10 | 11 | 11 |
| AO-1 | % | 0.08 | 0.08 | 0.08 | 0.08 | 0.08 | 0.08 | 0.08 | 0.08 | 0.08 | 0.08 | 0.08 |
| AO-2 | % | 0.08 | 0.08 | 0.08 | 0.08 | 0.08 | 0.08 | 0.08 | 0.08 | 0.08 | 0.08 | 0.08 |
| PETS | % | 0.50 | 0.50 | 0.50 | 0.50 | 0.50 | 0.50 | 0.3 | 0.30 | 0.3 | 0.30 | 0.3 |
| PC-Si | % | 0.00 | 0.00 | 0.00 | 0.00 | 0.00 | 0.00 | 14 | 14 | 14 | 0 | 0 |
| MBS | % | 2 | 2 | 2 | 0 | 0 | 0 | 0 | 0 | 0 | 6.5 | 6.5 |
| TSAN | % | 0.85 | 0.85 | 0.85 | 0.65 | 0.65 | 0.65 | 1 | 1 | 1 | 0.65 | 0.65 |
| Nitrile PC-1 | % | 0 | 19.4 | 0 | 0 | 31.0 | 0 | 0 | 0 | 0 | 0 | 0 |
| Nitrile PC-2 | % | 0 | 41.6 | 40 | 0 | 39.7 | 37.35 | 0 | 69.54 | 33.5 | 0 | 37.47 |

TABLE 17

| PHYSICAL PROP. | Units | A1 | A2 | A3 | A4 | A5 | A6 | A7 | A8 | A9 | A10 | A11 |
|---|---|---|---|---|---|---|---|---|---|---|---|---|
| MVR-ASTM, 260° C., 2.16 kg | cm$^3$/10 min | 38.9 | 36.7 | 32.4 | 19.4 | 16.6 | 15.9 | 18.8 | 15.3 | 15.3 | 19.3 | 16.4 |
| Spiral Flow, 260° C./65 C, 0.09 in | in | 31.0 | 33.0 | 35.0 | 21.8 | 21.0 | 22.0 | 19.3 | 17.8 | 18.5 | 21.5 | 19.3 |
| IZOD ASTM Impact Strength, 23° C. | J/m | 48 | 41 | 46 | 636 | 594 | 624 | 661 | 636 | 676 | 569 | 631 |
| Ductility | % | 0 | 0 | 0 | 100 | 100 | 100 | 100 | 100 | 100 | 100 | 100 |
| IZOD ISO Impact Strength, 23° C. | kJ/m$^2$ | 4.4 | 3.9 | 4.1 | 7.9 | 11.2 | 11.1 | 12.5 | 15.1 | 13.6 | 27.8 | 22.4 |
| Ductility | % | 0 | 40 | 30 | 0 | 0 | 30 | 0 | 0 | 0 | 80 | 100 |
| CHAR ISO Impact Strength, 23° C. | kJ/m$^2$ | 15.1 | 16.6 | 18.1 | 10.1 | 24.6 | 31.6 | 28.8 | 31.6 | 28.4 | 34.1 | 30.4 |
| Ductility | % | 60 | 70 | 60 | 10 | 70 | 100 | 0 | 40 | 20 | 100 | 100 |
| MAI, Energy to max load, 23° C. | J | 49.5 | 44.7 | 41.8 | 55.9 | 54.5 | 56.1 | 61.9 | 63 | 63.4 | NT | NT |
| Ductility | % | 100 | 80 | 90 | 50 | 100 | 100 | 100 | 100 | 100 | NT | NT |
| Modulus of Elasticity | MPa | 2820 | 2850 | 3100 | 2920 | 2870 | 2880 | 2830 | 2770 | 2780 | 2561 | 2545 |
| Tensile Stress at Yield | MPa | 66 | 66 | 67 | 64 | 65 | 65 | 66 | 67 | 67 | 64 | 64 |
| Tensile Stress at Break | MPa | 48 | 47 | 47 | 50 | 53 | 55 | 52 | 54 | 52 | 47 | 47 |
| Elongation at Yield | % | 4 | 4 | 3 | 4 | 4 | 4 | 4 | 4 | 4 | 4 | 4 |
| Elongation at Break | % | 58 | 41 | 47 | 80 | 109 | 129 | 91 | 109 | 77 | 44 | 55 |
| Flexural Modulus, 1.27 mm/min, 3.2 mm bar | MPa | 2980 | 2940 | 2950 | 2830 | 2850 | 2830 | 2790 | 2810 | 2800 | 2260 | 2240 |
| Flex Stress@5% Strain | MPa | 100 | 99 | 100 | 99 | 100 | 99 | 100 | 101 | 100 | 98 | 99 |
| HDT 0.45 MPa, 3.2 mm | ° C. | 83 | 80 | 81 | 97 | 98 | 97 | 100 | 99 | 99 | NT | NT |
| HDT 1.82 MPa, 6.4 mm | ° C. | NT | NT | NT | NT | NT | NT | NT | NT | NT | 92 | 93 |

NT—Not tested

TABLE 19

|  |  | A4 | A5 | A6 |
|---|---|---|---|---|
| V0/1.2 mm, 23° C., 48 hr | pftp | 0.13 | 0.36 | 0.12 |
|  | fot2, s | 7.3 | 6.0 | 7.8 |
|  | UL Comments | 3/20 drip | 1/20 drip | no drip |
| V0/1.2 mm, 70° C., 168 hr | pftp | 0.00 | 0.08 | 0.11 |
|  | fot2, s | 11.0 | 8.4 | 6.2 |
|  | UL Comments | 6/20 drip | no drip | 4/20 drip |
| 5VB/1.8 mm, 23° C., 48 hr | fot, s | 4.7 | 5.1 | 3.4 |
|  | UL Comments | 2/5 drip | no drip | no drip |
| 5VB/1.8 mm, 70° C., 168 hr | fot, s | 2.4 | 6.4 | 5.4 |
|  | UL Comments | 1/5 drip | no drip | no drip |

TABLE 20

|  |  | A7 | A8 | A9 |
|---|---|---|---|---|
| V0/0.6 mm, 23° C., 48 hr | pftp | 0.00 | 0.44 | 0.08 |
|  | fot2 | 7.0 | 5.4 | 7.0 |
|  | UL Comments | no drip | no drip | no drip |
| V0/0.75 mm, 23° C., 48 hr | pftp | 1.00 | 1.00 | 1.00 |
|  | fot2, s | 2.1 | 1.8 | 2.7 |
|  | UL Comments | no drip | no drip | no drip |
| V0/0.75 mm, 70° C., 168 hr | pftp | 1.00 | 0.71 | 1.00 |
|  | fot2, s | 1.4 | 2.7 | 2.1 |
|  | UL Comments | no drip | no drip | no drip |
| 5VB/1.2 mm, 23° C., 48 hr | fot, s | 8.5 | 3.2 | 10.9 |
|  | UL Comments | no drip | no drip | no drip |
| 5VB/1.2 mm, 70° C., 168 hr | fot | 11.1 | 5.5 | 6.7 |
|  | UL Comments | no drip | no drip | no drip |

TABLE 21

|  |  | A10 | A11 |
|---|---|---|---|
| V0/1.5 mm, 23° C., 48 hr | pftp | 0.70 | 1.00 |
|  | fot2, s | 4.4 | 2.3 |
|  | UL Comments | no drip | no drip |
| V0/1.5 mm, 70° C., 168 hr | pftp | 1.00 | 0.85 |
|  | fot2, s | 2.7 | 3.5 |
|  | UL Comments | no drip | no drip |
| 5VB/2 mm, 23° C., 48 hr | fot, s | 6.3 | 6.5 |
|  | UL Comments | 1/10 drip | no drip |
| 5VB/2 mm, 70° C., 168 hr | fot, s | 5.7 | 5.0 |
|  | UL comments | no drip | no drip |
| 5VB/2.3 mm, 23° C., 48 hr | fot, s | 5.4 | 6.0 |
|  | UL Comments | no drip | no drip |
| 5VB/2.3 mm, 70° C., 168 hr | fot, s | 4.0 | 4.2 |
|  | UL comments | no drip | no drip |

Tables 17 to 21 show that the samples having a portion of the polycarbonate homopolymer or all of the polycarbonate homopolymer replaced with the nitrile-PC had comparable physical properties to the samples without the nitrile-PC and better flame retardant properties. Specifically, for samples having nitrile-PC, the flow, impact, modulus and ductility of the blends was well balanced, and the flame retardant properties were excellent at thinner wall thicknesses for both UL94 V and 5VB ratings.

The data in Table 18 shows that for very high flow PC/ABS blends, the flame retardant performance could pass V0 testing at 1.2 mm and 5VB testing at 1.8 mm with the addition of the nitrile-PC, which is a significant improvement compared to the control without the nitrile-PC (only the polycarbonate homopolymer). The data in Tables 19 to 21 show similar results where the samples having nitrile-PC instead of or in addition to polycarbonate homopolymer had superior flame retardant properties.

The singular forms "a," "an," and "the" include plural referents unless the context clearly dictates otherwise. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. The endpoints of all ranges directed to the same component or property are inclusive of the endpoint and independently combinable. All references are incorporated herein by reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. The term "substituted" as used herein means that any at least one hydrogen on the designated atom or group is replaced with another group, provided that the designated atom's normal valence is not exceeded. When the substituent is oxo (i.e., =O), then two hydrogens on the atom are replaced. Also as used herein, the term "combination" is inclusive of blends, mixtures, alloys, reaction products, and the like.

The term "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom; "cycloalkyl" refers to a non-aromatic monovalent monocyclic or multicyclic hydrocarbon group having at least three carbon atoms; "cycloalkylene" refers to a non-aromatic divalent monocyclic or multicyclic hydrocarbon group having at least three carbon atoms; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to a an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

An "organic group" as used herein means a saturated or unsaturated (including aromatic) hydrocarbon having a total of the indicated number of carbon atoms and that can be unsubstituted or unsubstituted with one or more of halogen, nitrogen, sulfur, or oxygen, provided that such substituents do not significantly adversely affect the desired properties of the composition, for example transparency, heat resistance, or the like. When a group or compound is "substituted or unsubstituted", the moiety optionally contains one or more exemplary substituents including $C_{1-12}$ alkyl, $C_{1-12}$ alkenyl, $C_{1-12}$ alkynyl, $C_{3-12}$ cycloalkyl, $C_{6-18}$ aryl, $C_{7-12}$ alkylaryl, $C_{7-18}$ arylalkyl, —$NO_2$, SH, —CN, OH, halogen, $C_{1-12}$ alkoxy, $C_{1-12}$ aryloxy, $C_{1-12}$ acyl, $C_{1-12}$ alkoxy carbonyl, and $C_{1-12}$ amide groups.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:
1. A thermoplastic composition comprising:
a polycarbonate having repeating structural carbonate units of the formula

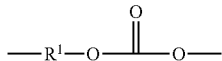

wherein at least 60 percent of the total number of $R^1$ groups contain aromatic organic groups and the balance thereof are aliphatic, alicyclic, or aromatic groups; and wherein
the polycarbonate comprises cyanophenyl carbonate endcapping groups derived from reaction with a cyanophenol of the formula

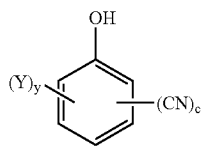

wherein Y is a halogen, $C_{1-3}$ alkyl group, $C_{1-3}$ alkoxy group, $C_{7-12}$ arylalkyl, alkylaryl, or nitro group, y is 0 to 4, and c is 1 to 5, provided that y+c is 1 to 5;
an impact modifier; and
a flame retardant.

2. The thermoplastic composition of claim 1, wherein the polycarbonate further comprises a branching agent.

3. The thermoplastic composition of claim 2, wherein the branching agent is a structure derived from a triacid trichloride of the formula

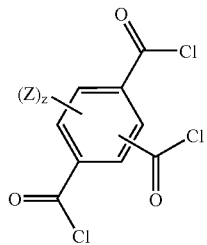

wherein Z is a halogen, $C_{1-3}$ alkyl group, $C_{1-3}$ alkoxy group, $C_{7-12}$ arylalkyl, alkylaryl, or nitro group, and z is 0 to 3; or wherein the branching agent is a structure derived from a tri-substituted phenol of the formula

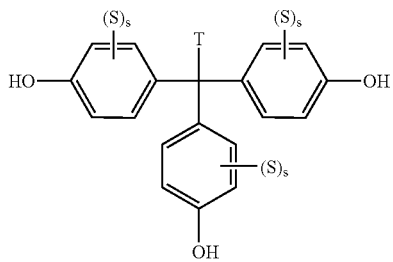

wherein T is a $C_{1-20}$ alkyl group, $C_{1-20}$ alkyleneoxy group, $C_{7-12}$ arylalkyl, or alkylaryl group, S is a halogen, $C_{1-3}$ alkyl group, $C_{1-3}$ alkoxy group, $C_{7-12}$ arylalkyl, alkylaryl, or nitro group, s is 0 to 4; or wherein the branching agent comprises a structure of the formula

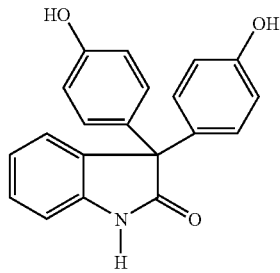

or a combination of comprising one or more of the branching agents.

4. The thermoplastic composition of claim 1, wherein the flame retardant is a phosphorous containing flame retardant, a flame retardant salt, or a cyclic siloxane or a combination of two or more of the foregoing.

5. The thermoplastic composition of claim 1, wherein the cyanophenyl endcapping groups are present in an amount of 2 to 20 cyanophenyl carbonate units per 100 $R^1$ units.

6. The thermoplastic composition of claim 2, wherein the branching agent groups are present in an amount of 0.3 to 6 branching units per 100 $R^1$ units.

7. The thermoplastic composition of claim 2, wherein the branching agent has formula

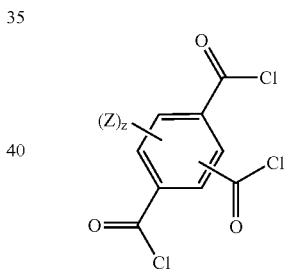

wherein z is 0.

8. The thermoplastic composition of claim 2, wherein the branching agent has formula

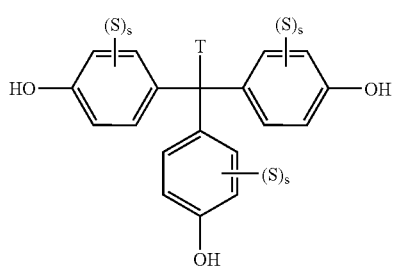

wherein T is methyl and s is 0.

9. The thermoplastic composition of claim 1, wherein the cyanophenol is p-cyanophenol, 3,4-dicyanophenol, or a combination comprising at least one of the foregoing phenols.

10. The thermoplastic composition of claim 6, wherein $R^1$ is derived from a bisphenol of the formula:

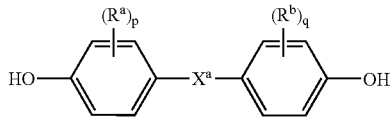

wherein $R^a$ and $R^b$ each represents a halogen atom or a monovalent $C_1$-$C_{12}$ hydrocarbon group and can be the same or different;

p and q are each independently integers of 0 to 4; and $X^a$ represents a single bond or one of the groups of formula:

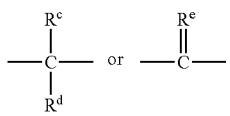

wherein $R^c$ and $R^d$ each independently represents a hydrogen atom or a monovalent $C_1$-$C_8$ linear alkyl or cyclic $C_4$-$C_8$ alkylene group; and $R^e$ is a divalent $C_1$-$C_8$ hydrocarbon group.

11. The thermoplastic composition of claim 10, wherein p is 0, and $R^c$ and $R^d$ each independently represents a hydrogen atom or a monovalent $C_1$-$C_8$ linear alkyl group.

12. The thermoplastic composition of claim 11, wherein p is 0, and $R^c$ and $R^d$ are each a methyl group.

13. The thermoplastic composition of claim 1, wherein the impact modifier is selected from the group consisting of ABS, MBS, Bulk ABS, AES, ASA, MABS, polycarbonate-polysiloxane copolymer and combinations thereof.

14. An article comprising the composition of claim 6.

15. The article of claim 14, wherein the article is capable of achieving a UL94 rating of V0 at a thickness of 0.75 mm.

16. The article of claim 14, wherein the article is capable of achieving a UL94 rating of 5VB at a thickness of 1.2 mm.

17. A method of manufacturing an article comprising:
extruding the thermoplastic composition of claim 1; and
molding the extruded composition into an article.

18. A thermoplastic composition comprising:
a polycarbonate having repeating structural carbonate units of the formula

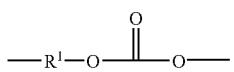

wherein at least 60 percent of the total number of $R^1$ groups contain aromatic organic groups and the balance thereof are aliphatic, alicyclic, or aromatic groups; and wherein
the polycarbonate comprises cyanophenyl carbonate endcapping groups derived from reaction with a cyanophenol of the formula

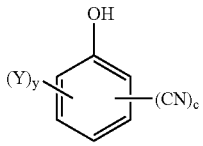

wherein Y is hydrogen, a halogen, $C_{1-3}$ alkyl group, $C_{1-3}$ alkoxy group, $C_{7-12}$ arylalkyl, alkylaryl, or nitro group, y is 0 to 4, and c is 1 to 5, provided that y+c is 1 to 5;
an impact modifier; and
a flame retardant,
wherein the composition is capable of achieving a UL94 V0 rating at 0.75 mm and a UL94 5VB rating at 1.2 mm thickness.

19. The thermoplastic composition of claim 18, wherein the flame retardant is a phosphorous containing flame retardant, a flame retardant salt, or a cyclic siloxane or a combination of two or more of the foregoing.

20. The thermoplastic composition of claim 18, wherein the polycarbonate further comprises a branching agent wherein the branching agent groups are present in an amount of 0.3 to 6 branching units per 100 $R^1$ units.

21. A thermoplastic composition comprising:
a polycarbonate having repeating structural carbonate units of the formula

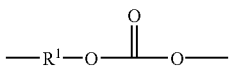

wherein at least 60 percent of the total number of $R^1$ groups contain aromatic organic groups and the balance thereof are aliphatic, alicyclic, or aromatic groups; and wherein
the polycarbonate comprises cyanophenyl carbonate endcapping groups derived from reaction with a cyanophenol of the formula

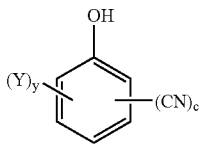

wherein Y is hydrogen, a halogen, $C_{1-3}$ alkyl group, $C_{1-3}$ alkoxy group, $C_{7-12}$ arylalkyl, alkylaryl, or nitro group, y is 0 to 4, and c is 1 to 5, provided that y+c is 1 to 5, wherein the cyanophenyl endcapping groups are present in an amount of 2 to 20 cyanophenyl carbonate units per 100 $R^1$ units, and wherein the cyanophenol is p-cyanophenol, 3,4-dicyanophenol, or a combination comprising at least one of the foregoing phenols;
an impact modifier; and
a flame retardant,
wherein the composition is capable of achieving a UL94 V0 rating at 0.75 mm and a UL94 5VB rating at 1.2 mm thickness.

22. The thermoplastic composition of claim 20, wherein the polycarbonate further comprises a branching agent wherein the branching agent groups are present in an amount of 0.3 to 6 branching units per 100 $R^1$ units.

23. A thermoplastic composition comprising:
a polycarbonate having repeating structural carbonate units of the formula

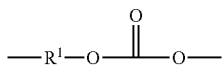

wherein at least 60 percent of the total number of $R^1$ groups contain aromatic organic groups and the balance thereof are aliphatic, alicyclic, or aromatic groups; and wherein
the polycarbonate comprises cyanophenyl carbonate end-capping groups derived from reaction with a cyanophenol of the formula

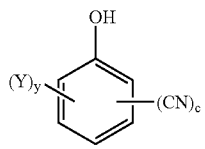

wherein Y is hydrogen, a halogen, $C_{1-3}$ alkyl group, $C_{1-3}$ alkoxy group, $C_{7-12}$ arylalkyl, alkylaryl, or nitro group, y is 0 to 4, and c is 1 to 5, provided that y+c is 1 to 5, wherein the cyanophenyl endcapping groups are present in an amount of 2 to 20 cyanophenyl carbonate units per 100 $R^1$ units, and wherein the cyanophenol is p-cyanophenol, 3,4-dicyanophenol, or a combination comprising at least one of the foregoing phenols; and wherein
the polycarbonate comprises a branching agent wherein the branching agent groups are present in an amount of 0.3 to 6 branching units per 100 $R^1$ units,
wherein the branching agent is a structure derived from a triacid trichloride of the formula

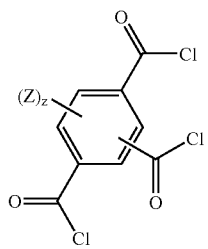

wherein Z is a halogen, $C_{1-3}$ alkyl group, $C_{1-3}$ alkoxy group, $C_{7-12}$ arylalkyl, alkylaryl, or nitro group, and z is 0 to 3; or wherein the branching agent is a structure derived from a tri-substituted phenol of the formula

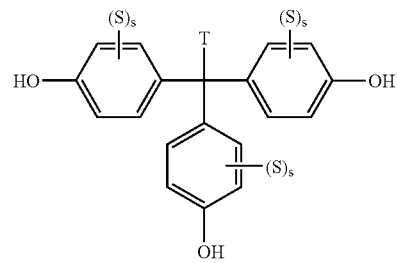

wherein T is a $C_{1-20}$ alkyl group, $C_{1-20}$ alkyleneoxy group, $C_{7-12}$ arylalkyl, or alkylaryl group, S is a halogen, $C_{1-3}$ alkyl group, $C_{1-3}$ alkoxy group, $C_{7-12}$ arylalkyl, alkylaryl, or nitro group, s is 0 to 4; or wherein the branching agent comprises a structure of the formula

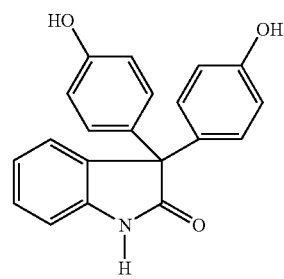

or a combination of comprising one or more of the branching agents;
an impact modifier; and
a flame retardant,
wherein the composition is capable of achieving a UL94 V0 rating at 0.75 mm and a UL94 5VB rating at 1.2 mm thickness.

* * * * *